(12) United States Patent
Bae et al.

(10) Patent No.: US 10,393,090 B2
(45) Date of Patent: Aug. 27, 2019

(54) BLADE FOR WIND POWER GENERATOR

(71) Applicant: INDUSTRY-UNIVERSITY COOPERATION FOUNDATION OF KOREA AEROSPACE UNIVERSITY, Goyang-si (KR)

(72) Inventors: Jae-Sung Bae, Seoul (KR); Soo-Yong Lee, Paju-si (KR); Dong-Guk Choi, Goyang-si (KR)

(73) Assignee: INDUSTRY-UNIVERSITY COOPERATION FOUNDATION OF KOREA AEROSPACE UNIVERSITY, Gyeonggi-Do (KR)

( * ) Notice: Subject to any disclaimer, the term of this patent is extended or adjusted under 35 U.S.C. 154(b) by 304 days.

(21) Appl. No.: 15/626,548

(22) Filed: Jun. 19, 2017

(65) Prior Publication Data
US 2017/0363060 A1 Dec. 21, 2017

(30) Foreign Application Priority Data
Jun. 21, 2016 (KR) ........................ 10-2016-0077487

(51) Int. Cl.
*F03D 1/06* (2006.01)

(52) U.S. Cl.
CPC ......... *F03D 1/0641* (2013.01); *F03D 1/0683* (2013.01); *F03D 1/0633* (2013.01); *F03D 1/0675* (2013.01); *F05B 2240/21* (2013.01); *F05B 2240/221* (2013.01); *F05B 2240/2212* (2013.01); *Y02E 10/721* (2013.01); *Y02P 70/523* (2015.11)

(58) Field of Classification Search
CPC .... F03D 1/0641; F03D 1/0683; F03D 1/0633; F03D 1/0675; F04D 29/388
See application file for complete search history.

(56) References Cited

U.S. PATENT DOCUMENTS

| 4,295,790 | A | * | 10/1981 | Eggert, Jr. | ............ F03D 1/0675 416/226 |
| 5,041,182 | A | * | 8/1991 | Sekiguchi | ............. B29C 70/345 156/245 |
| 6,146,097 | A | * | 11/2000 | Bradt | .................... F04D 25/088 416/169 R |

(Continued)

OTHER PUBLICATIONS

Korean Office Action—Korean Application No. 10-2016-0077487 dated Nov. 17, 2016, citing US 2009/0162208, US 2010/0278654 and US 2014/0119940.

*Primary Examiner* — Erick R Solis
*Assistant Examiner* — Anthony L Bacon
(74) *Attorney, Agent, or Firm* — Cantor Colburn LLP

(57) ABSTRACT

Provided is a blade for a wind power generator comprising: a main spar including: an upper main spar flange and a lower main spar flange whose both ends are protruded towards the front and rear side respectively; a front main spar web and a rear main spar web which are connecting the upper main spar flange and the lower main spar flange; a first body, located in the front side of the main spar, including an inverted D-type rib; and a second body, located in the rear side of the main spar, including a curved rib. The inverted D-type rib includes: a vertical frame; and a block frame extendedly formed from the upper side and the lower side of the vertical frame respectively and convexly formed towards the front side.

7 Claims, 21 Drawing Sheets

(56) References Cited

U.S. PATENT DOCUMENTS

| | | | | |
|---|---|---|---|---|
| 6,638,466 B1* | 10/2003 | Abbott | B29C 33/68 | 264/238 |
| 8,480,370 B2* | 7/2013 | Baker | F03D 1/0675 | 416/226 |
| 9,188,102 B2 | 11/2015 | Krishnamurthy et al. | | |
| 2009/0162208 A1 | 6/2009 | Zirin et al. | | |
| 2010/0068065 A1* | 3/2010 | Jensen | F03D 1/0641 | 416/241 R |
| 2010/0278654 A1 | 11/2010 | Kyriakides | | |
| 2011/0067795 A1* | 3/2011 | Hancock | F03D 1/0641 | 156/60 |
| 2011/0084174 A1* | 4/2011 | Hemmelgarn | B64C 3/48 | 244/200 |
| 2014/0119940 A1 | 5/2014 | Krishnamurthy et al. | | |
| 2014/0271217 A1* | 9/2014 | Baker | F03D 1/0633 | 416/226 |
| 2014/0301855 A1* | 10/2014 | Busbey | F03D 1/0641 | 416/223 R |
| 2014/0363303 A1* | 12/2014 | Roth-Johnson | F03D 1/0633 | 416/226 |
| 2016/0305398 A1* | 10/2016 | Carroll | F03D 1/0675 | |
| 2017/0074237 A1* | 3/2017 | Caruso | F03D 1/0675 | |

\* cited by examiner

BLADE FOR WIND POWER GENERATOR

CROSS-REFERENCE TO RELATED PATENT APPLICATION

This U.S. non-provisional patent application claims priority under 35 U.S.C. § 119 of Korean Patent Application No. 10-2016-0077487 filed on Jun. 21, 2016 in the Korean Patent Office, the entire contents of which are hereby incorporated by reference.

BACKGROUND

1. Technical Field

The present invention relates to a blade, more particularly, to a blade for a wind power generator.

2. Description of Related Art

Wind power generators that generate electric energy using wind power have been studied as an alternative energy source due to depletion of natural resources such as petroleum and coal natural gas due to industrial development and increase in population.

A wind power generator is provided with a nacelle at the top of a tower installed on the ground, and electrical energy is generated as a hub installed in the nacelle is rotated together with the blade by the wind blowing in from the front.

Conventional blades of wind power generator have been manufactured by mold-based method wherein synthetic resin and the like are poured into a mold. Therefore, in the case of a blade to be used in a large-sized wind power generator, there have been problems that the manufacturing cost of the mold is high and a new mold must be fabricated every time the shape of the blade is improved.

In addition, since the blades are fabricated by the mold-based method, there have been problems of limitations in the length of the blade for fabrication and its weight reduction.

In addition, since the blade is integrally formed using a mold, there has been problems of high transportation cost as well as frequent accidents occurring during transportation of the blade.

Accordingly, techniques for fabricating blades having a combined structure of ribs and spars have been researched, and such blade for wind power generators is disclosed in U.S. Pat. No. 9,188,102 (hereinafter, referred to as "prior art").

The blade for a wind power generator of the prior art comprises a span member, a plurality of leading edge regions located in front of the span member, and a plurality of trailing edge regions located in the rear side of the span member.

A plurality of leading edge regions maintains a leading edge shape forwardly convex towards the front side of the blade due to the leading edge layer and the ribs, and a plurality of trailing edge regions maintains a trailing edge shape backwardly protruded towards the back side of the blade due to the trailing edge reinforcing region and the ribs.

The plurality of leading edge regions and the plurality of trailing edge regions include fabric skins and ribs provided with gaskets at the edges thereof.

Each of the gasket, the rib and the span member is provided with a rivet hole. By inserting the rivet into the rivet hole, the plurality of leading edge regions is fastened and coupled to the front side of the span member, and the plurality of trailing edge regions is fastened and coupled to the back side of the span member.

As described above, in the case of a wind power generator of the prior art, there is a problem that it is difficult to attain a light weight of the blades because the ribs, the gaskets and the span members are formed with rivet holes and the rivets are inserted into the rivet holes to join the components.

In addition, there is a problem that since the rivet hole into which the rivet is to be inserted must be formed, the manufacturing process of the parts becomes more complicated and the manufacturing cost increases.

Also, due to the rivet hole and rivets inserted therein, the surface of the blade becomes non-smooth. Therefore, there is a problem that the flow of the wind passing over the surface of the blade cannot be made smoothly, so that the lifting force by the blade cannot be easily generated, thereby deteriorating the efficiency of the wind power generator.

PRIOR-ART DOCUMENTS

Patent Documents

U.S. Pat. No. 9,188,102

SUMMARY

An object of the present invention, devised for solving above describe problems, is to provide a blade for a wind power generator that can attain light weight of a blade, and at the same time, to reduce the manufacturing cost, and achieve a smooth lifting force generation.

A blade for a wind power generator according to an exemplary embodiment is characterized by comprising: a main spar; a first body located in the front side of the main spar; and a second body located in the rear side of the main spar, wherein the main spar comprises: a pair of main spar flanges whose both ends are protruded towards the front side and the rear side respectively; and a pair of main spar webs connecting the pair of main spar flanges, wherein a pair of steps is formed in the rear side of the first body so as to be coupled to the protruded front sides of the pair of main spar flanges, and another pair of steps is formed in the front side of the second body so as to be coupled to the protruded rear sides of the pair of main spar flanges, and wherein the steps and the pair of main spar flanges are coupled together with an adhesive.

In addition, it is characterized in that a rear spar located in the rear side of the second body is further included, wherein the rear spar includes: a pair of rear spar flanges whose one ends are forwardly protruded respectively; and a rear spar web connecting the pair of rear spar flanges, wherein a pair of steps is formed in the rear side of the second body so as to be coupled to the protruded front sides of the pair of rear spar flanges, and wherein the steps and the pair of rear spar flanges are coupled together with an adhesive.

In addition, it is characterized in that a third body located in the rear side of the rear spar; and a trailing edge spar located in the rear side of the third body, are included.

In addition, it is characterized in that a skin covering the first body, the second body, the main spar, the rear spar, the third body and the trailing edge spar is further included.

In addition, it is characterized in that the first body further comprises a plurality of C-type spars disposed in the front side of the main spar along the spanwise direction of the main spar, wherein a pair of steps is formed respectively in the upper side and the lower side of the plurality of C-type spars so as to be coupled to the protruded front end of the pair of main spar flanges.

In addition, it is characterized in that the first body comprises a plurality of inverted D-type ribs disposed in the front side of the main spar along the spanwise direction of the main spar, wherein each of the plurality of inverted D-type ribs comprises: a vertical fame whose rear surface is coupled to the front surface of the main spar web with an adhesive; and a block frame extendedly formed from the upper side and the lower side of the vertical frame respectively and convexly formed towards the front side, wherein a pair of steps is formed respectively in the upper side and the lower side of the vertical frame so as to be coupled to the protruded front side of the pair of main spar flanges.

In addition, it is characterized in that the first body further comprises a plurality of C-type covers respectively disposed between the adjacent inverted D-type ribs among the plurality of inverted D-type ribs.

In addition, it is characterized in that a third body located in the rear side of the rear spar; a trailing edge spar located in the rear side of the third body; and a skin covering the plurality of C-type covers, the second body, the main spar, the rear spar, the third body and the trailing edge spar, are further included.

In addition, it is characterized in that the second body comprises a plurality of curved ribs disposed between the main spar and the rear spar along the spanwise direction of the main spar and the rear spar so as to connect the rear side of the main spar and the front side of the rear spar, wherein each of the plurality of curved ribs comprises: a first vertical frame whose front surface is coupled to the rear surface of the main spar web with an adhesive; a second vertical frame whose rear surface is coupled to the front surface of the rear spar web with an adhesive; a first curved frame connecting the upper side of the first vertical frame and the upper side of the second vertical frame; and a second curved frame connecting the lower side of the first vertical frame and the lower side of the second vertical frame.

According to a blade for a wind power generator of the present invention, there are advantageous effects as follows.

The parts of the blades can be assembled together without a separate coupling member such as a rivet or the like, so that a weight reduction and a lower manufacturing cost for the blades for a wind power generator can be achieved.

In addition, since a smooth surface of the blade can be formed, the lifting force can be easily generated, and thus, effective wind power generation can be achieved.

DESCRIPTION OF SYMBOLS

Figure 1:
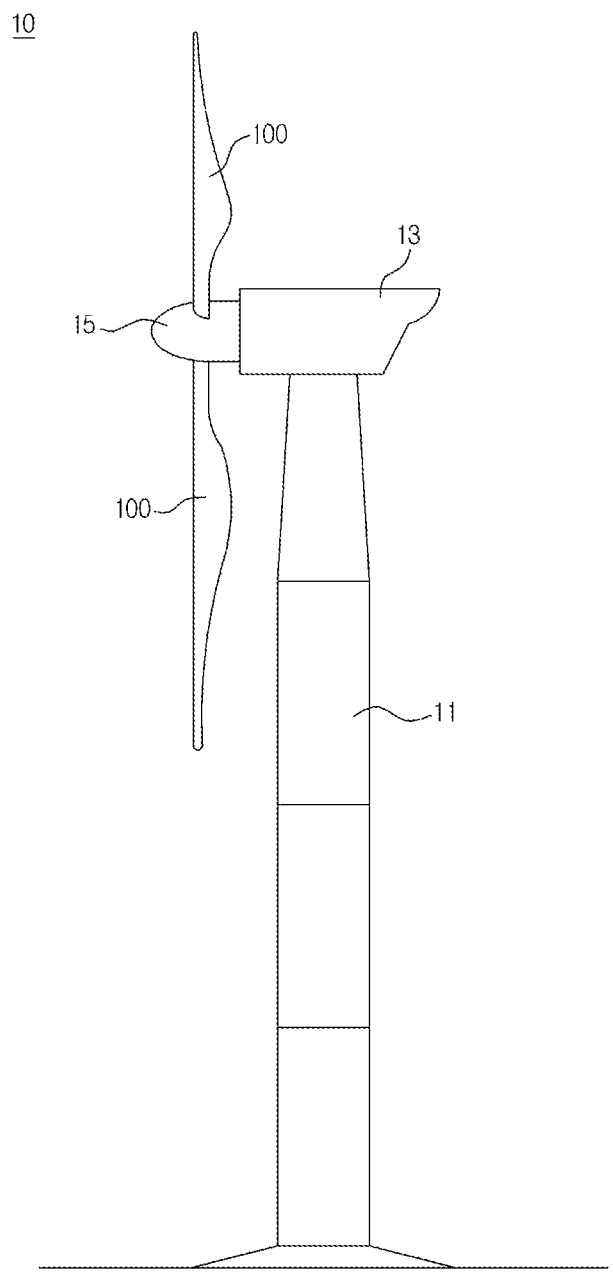
FIG. 1 is a side view of a wind power generator provided with a blade according to a preferred first exemplary embodiment of the present invention.

10: wind power generator
11: tower
13: nacelle
15: hub
100: blade
101: blade root
102: blade tip
103: leading edge
104: flat back
105: trailing edge
106: suction surface
107: pressure surface
110: main spar
111: upper main spar flange
113: lower main spar flange
115$a$: front main spar web
115$b$: rear main spar web
120: first body
121: C-type spar
121$a$: block portion
121$b$: upper end portion
121$c$: lower end portion
130: second body
131: curved rib
131$a$: first vertical frame
131$b$: second vertical frame
131$c$: first curved frame
131$d$: second curved frame
131$e$: reinforcing frame
133: curved rib skin
140: rear spar 141: upper rear spar flange
143: lower rear spar flange
145: rear spar web
150: third body
151: concave rib
151a: coupling frame
151b: upper frame
151c: lower frame
151d: trailing edge spar coupling portion
153: concave rib portion
170a, 170b, 170c, 170d, 170e, 170f, 170g, 170h: step
180: skin
190: first body
200: blade
300: blade
400: blade

DETAILED DESCRIPTION OF EMBODIMENTS

Hereinafter, the preferred exemplary embodiments of the present invention will be described with reference to the accompanying drawings as follows.

Figure 2:
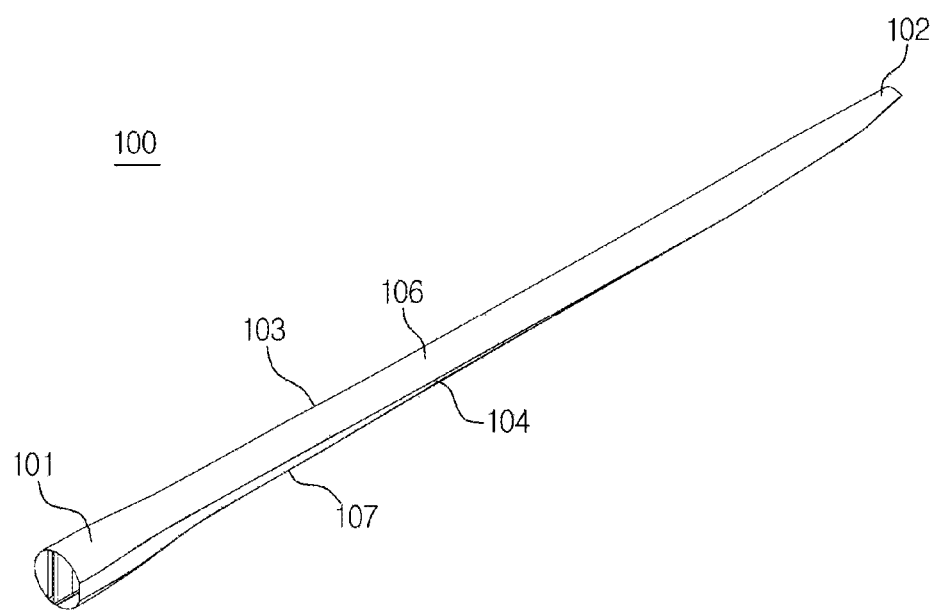
FIG. 2 is a perspective view of a blade according to the preferred first exemplary embodiment of the present invention.
Figure 3:
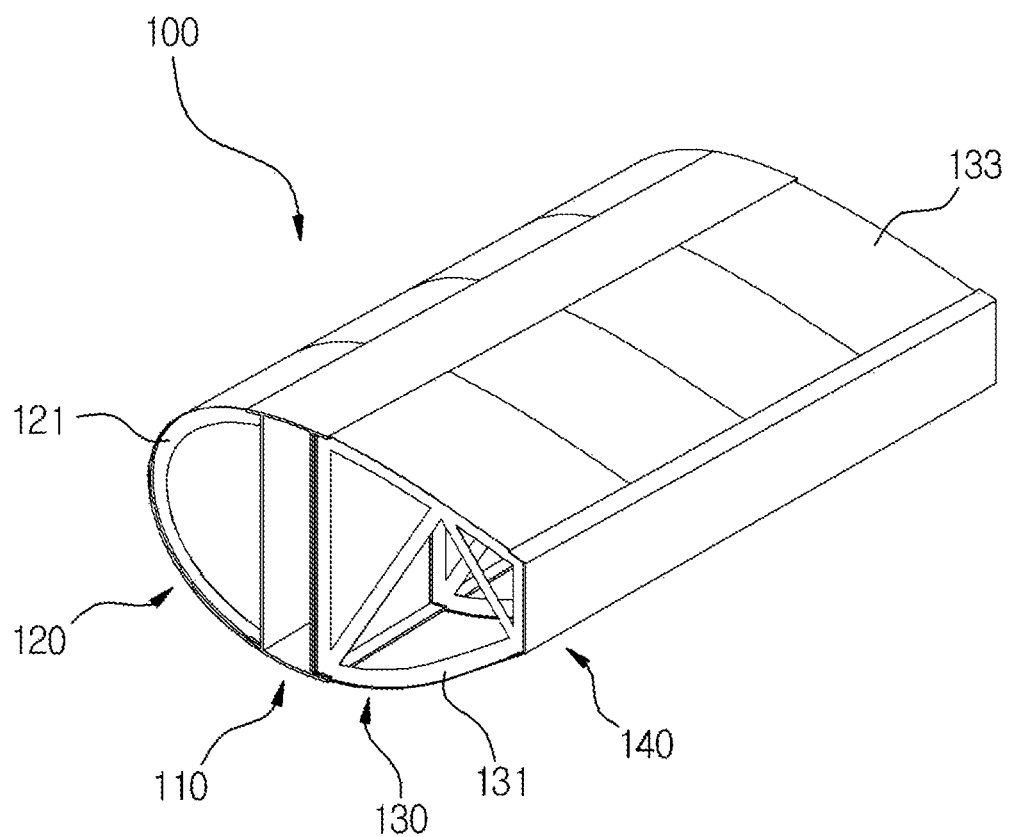
FIG. 3 is a perspective view illustrating a part of the blade in FIG. 2.
Figure 4:
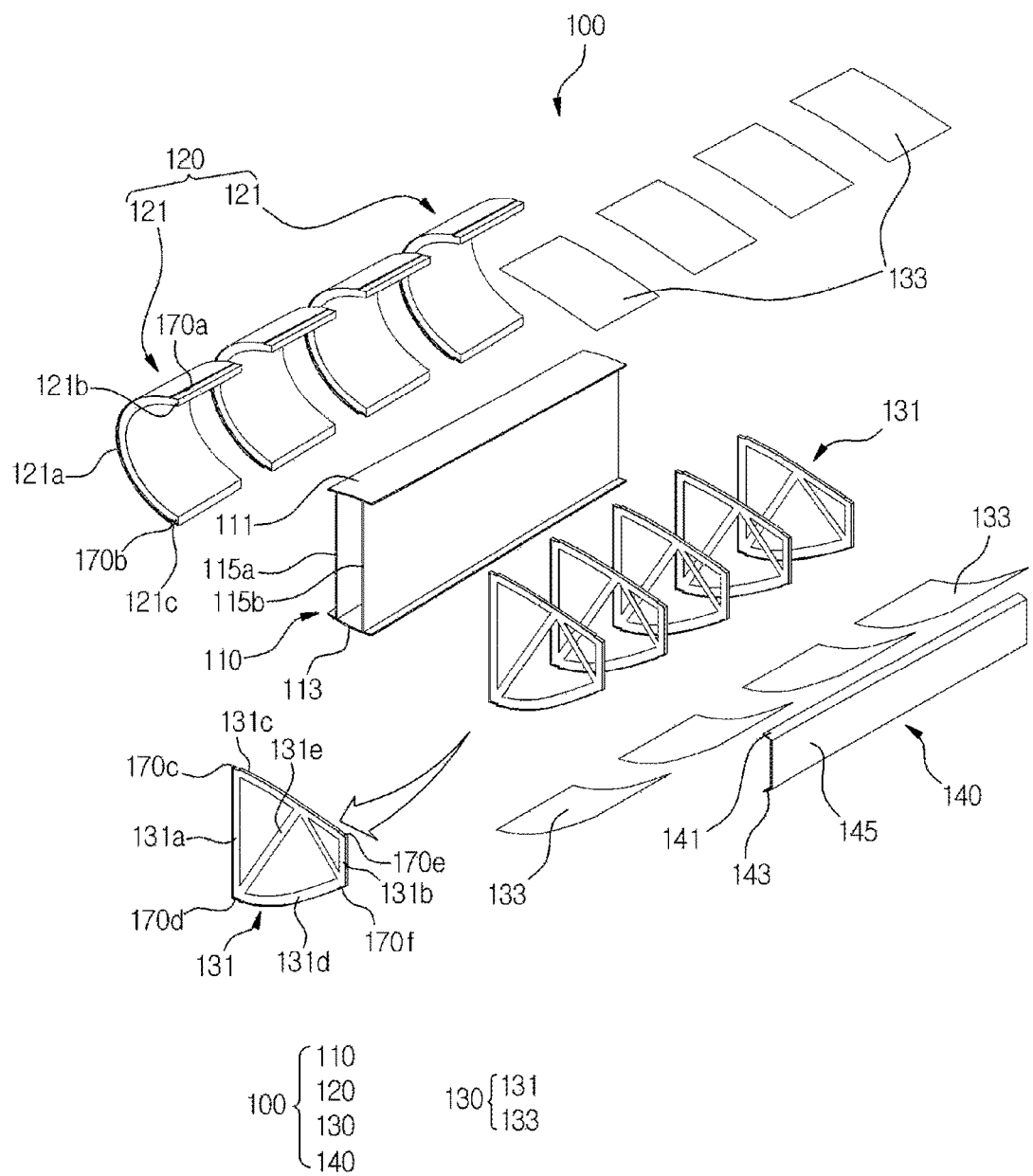
FIG. 4 is an exploded perspective view illustrating disassembled state of the blade in FIG. 3.
Figure 5:
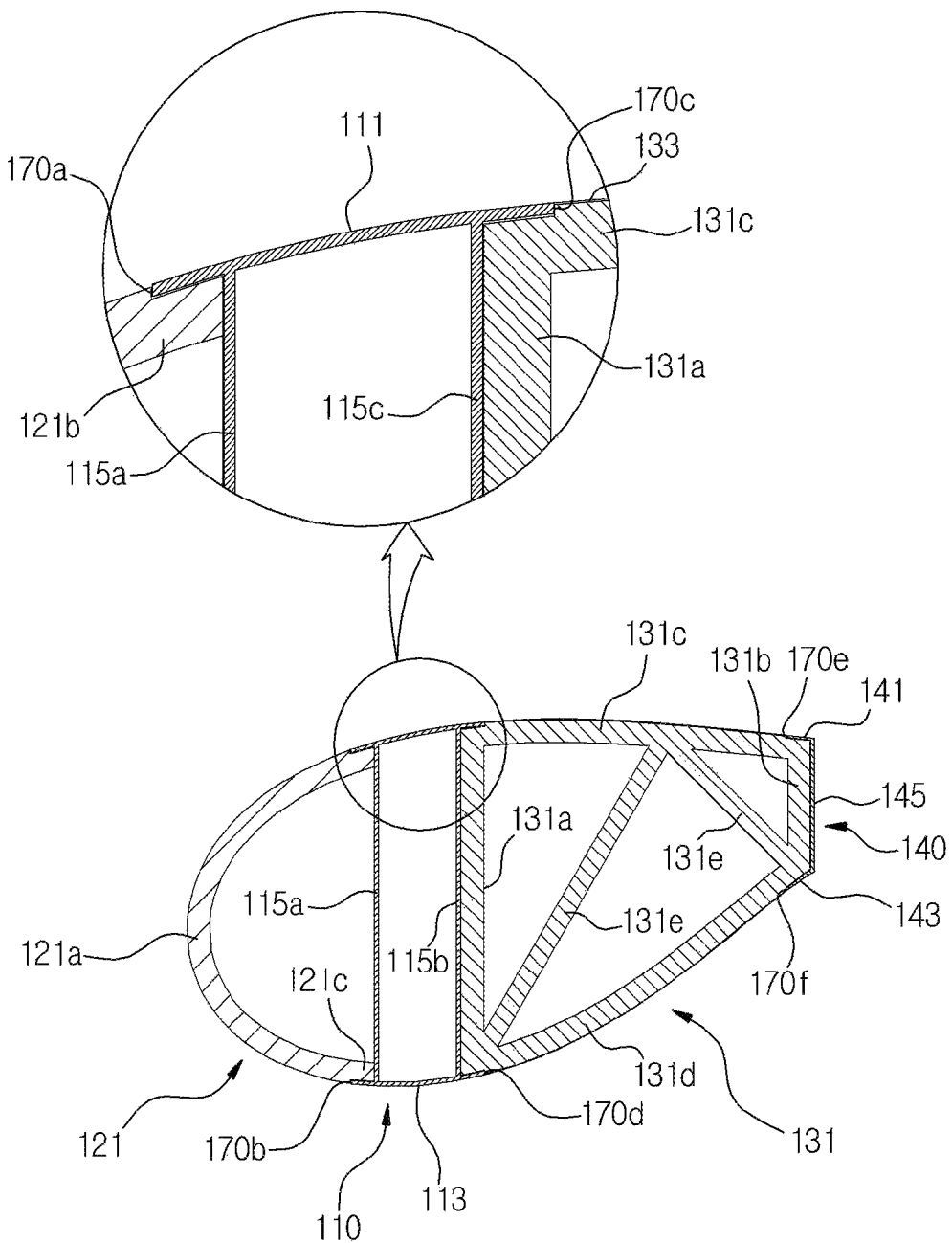
FIG. 5 is a cross-sectional view illustrating the cross-section of the blade in FIG. 3.
Figure 6:
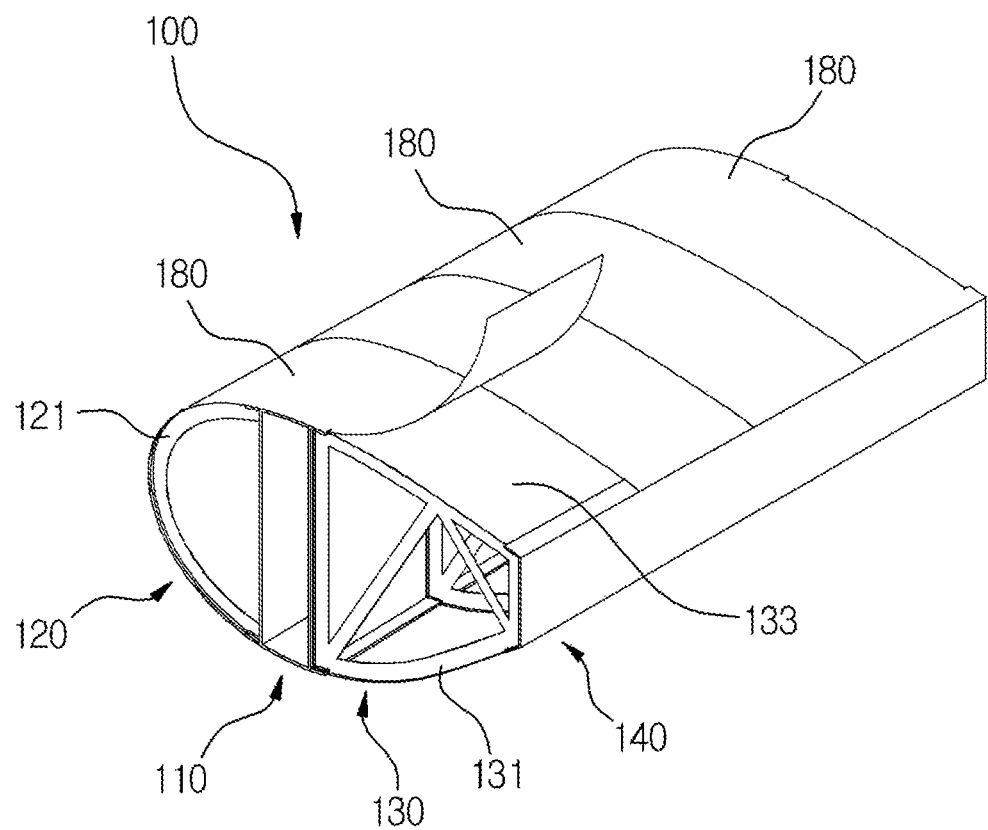
FIG. 6 is a perspective view illustrating the process of combining a plurality of skins into the blade.
Figure 7:
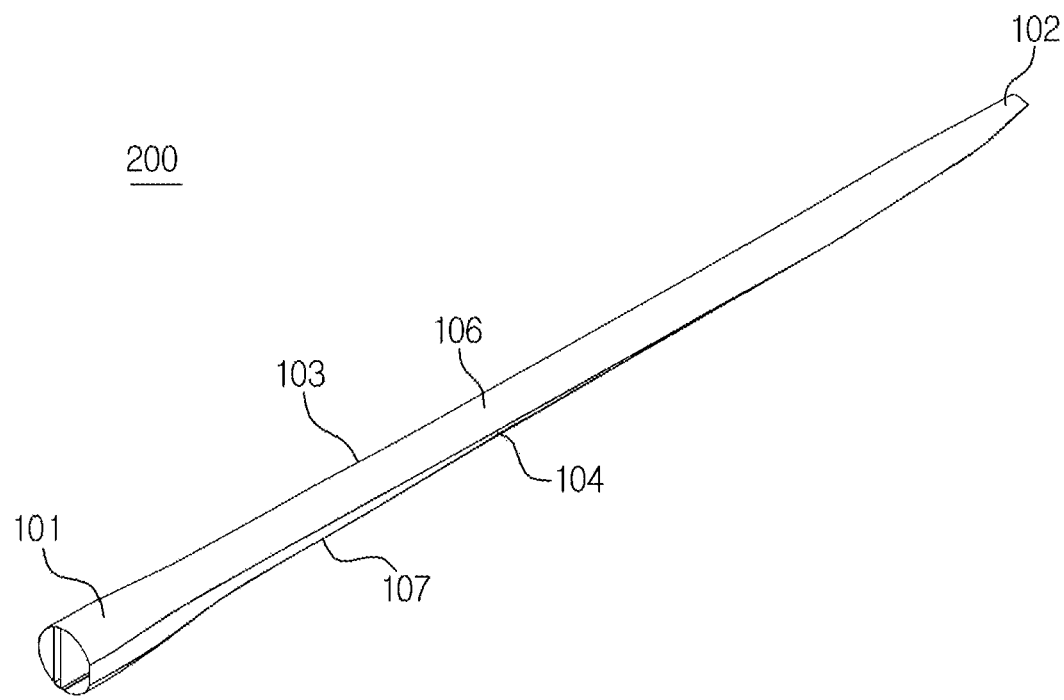
FIG. 7 is a perspective view of a blade according to the preferred second exemplary embodiment of the present invention.
Figure 8:
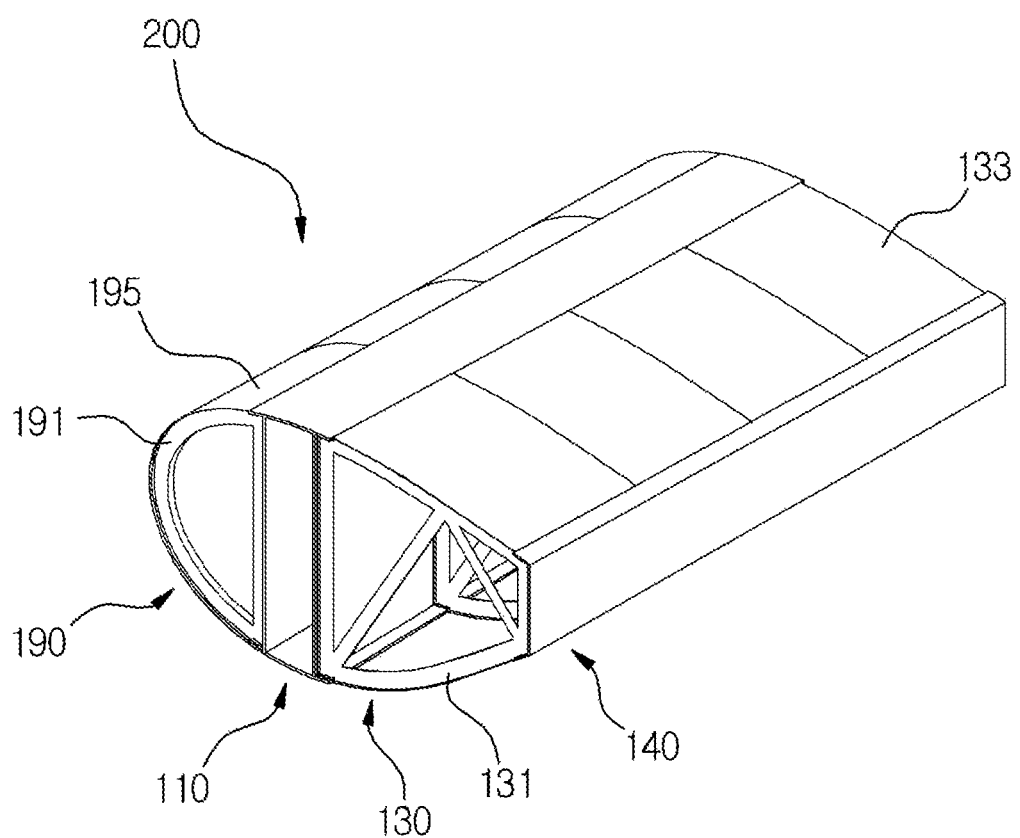
FIG. 8 is a perspective view illustrating a part of the blade in FIG. 7.
Figure 9:
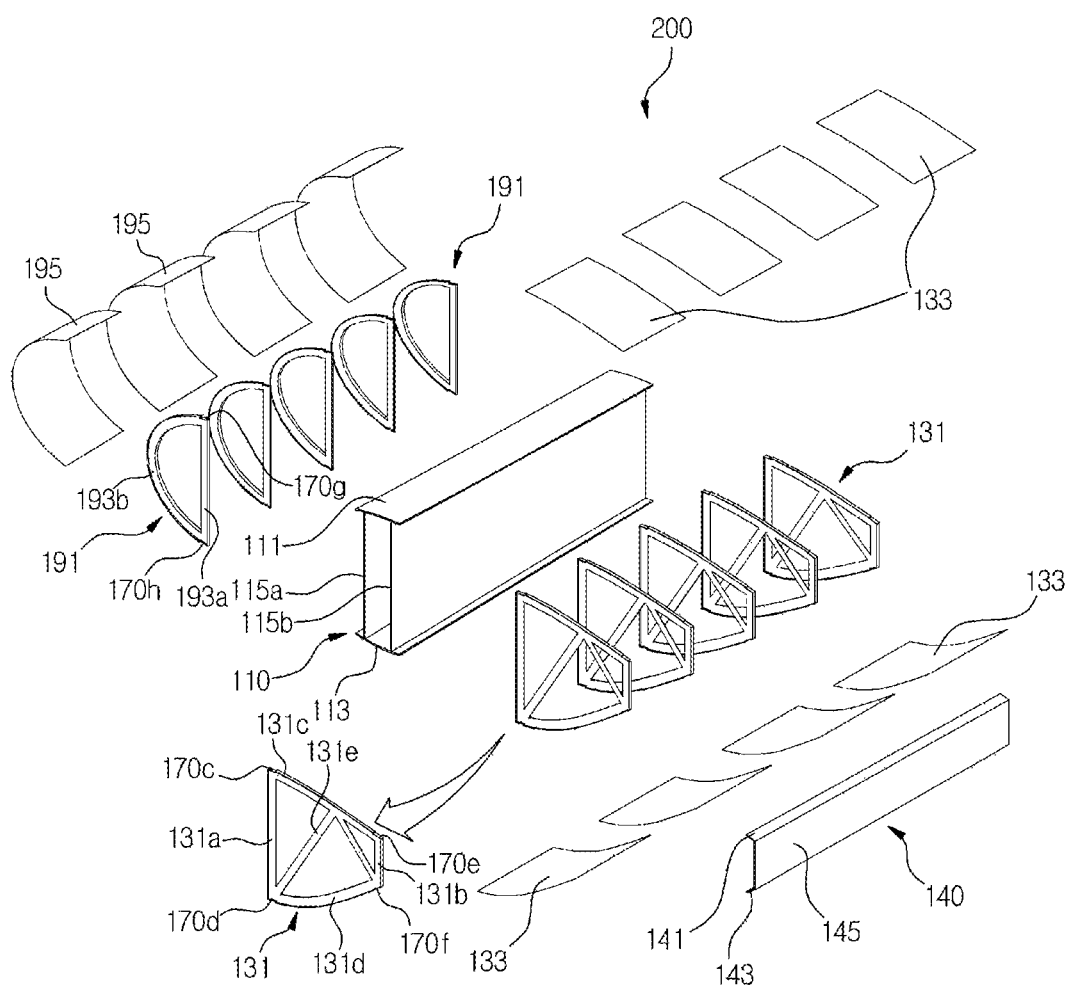
FIG. 9 is an exploded perspective view illustrating disassembled state of the blade in FIG. 8.
Figure 10:
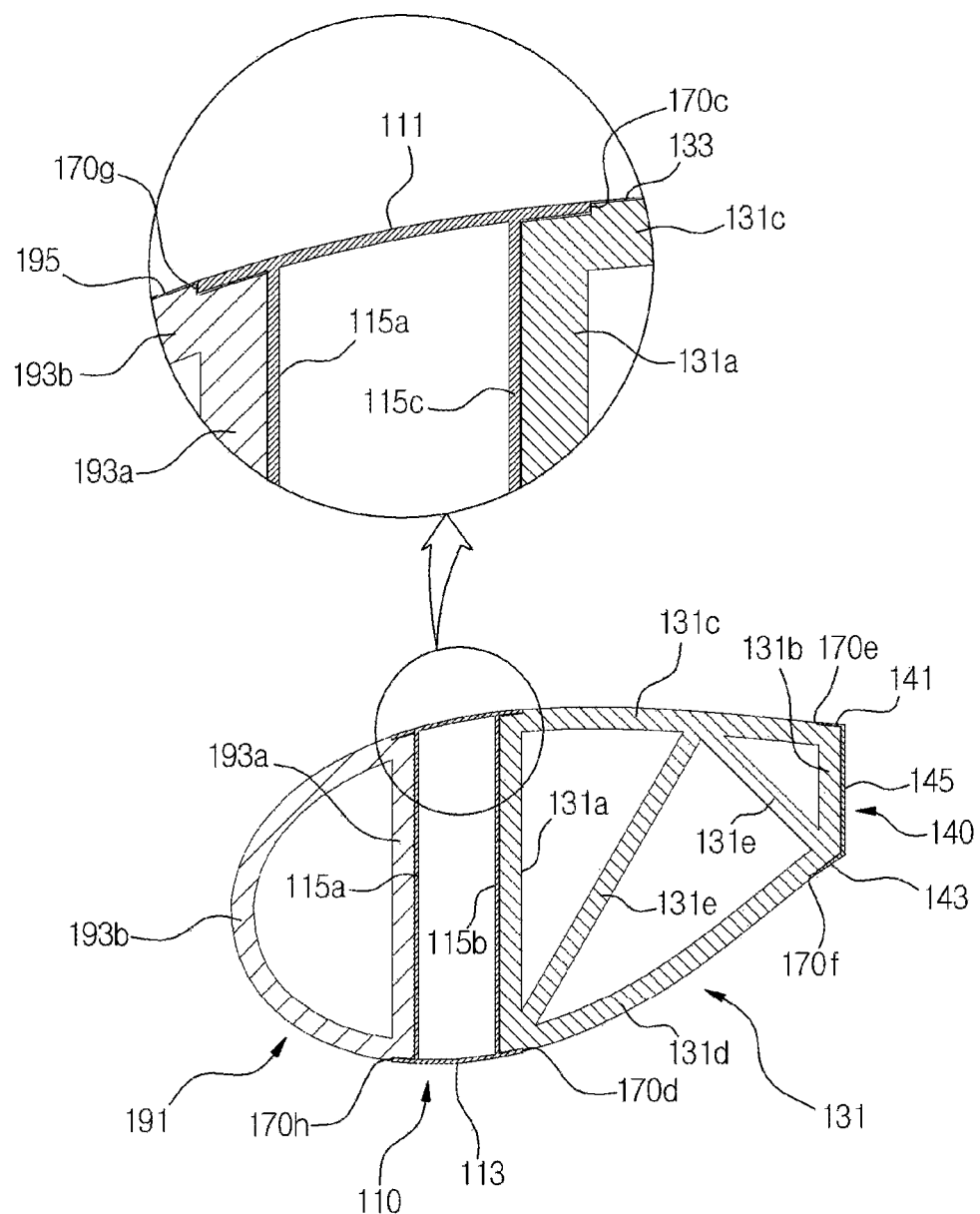
FIG. 10 is a cross-sectional view illustrating the cross-section of the blade in FIG. 8.
Figure 11:
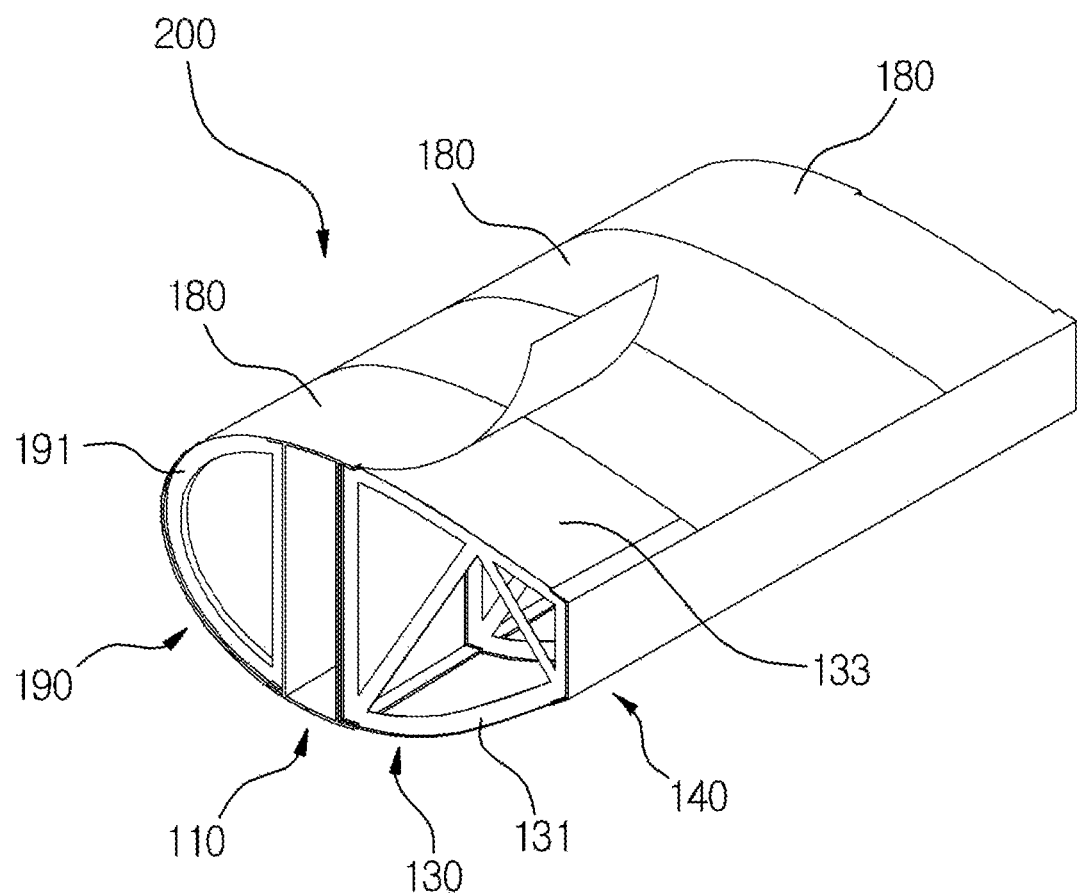
FIG. 11 is a perspective view illustrating the process of combining a plurality of skins into the blade in FIG. 8.
Figure 12:
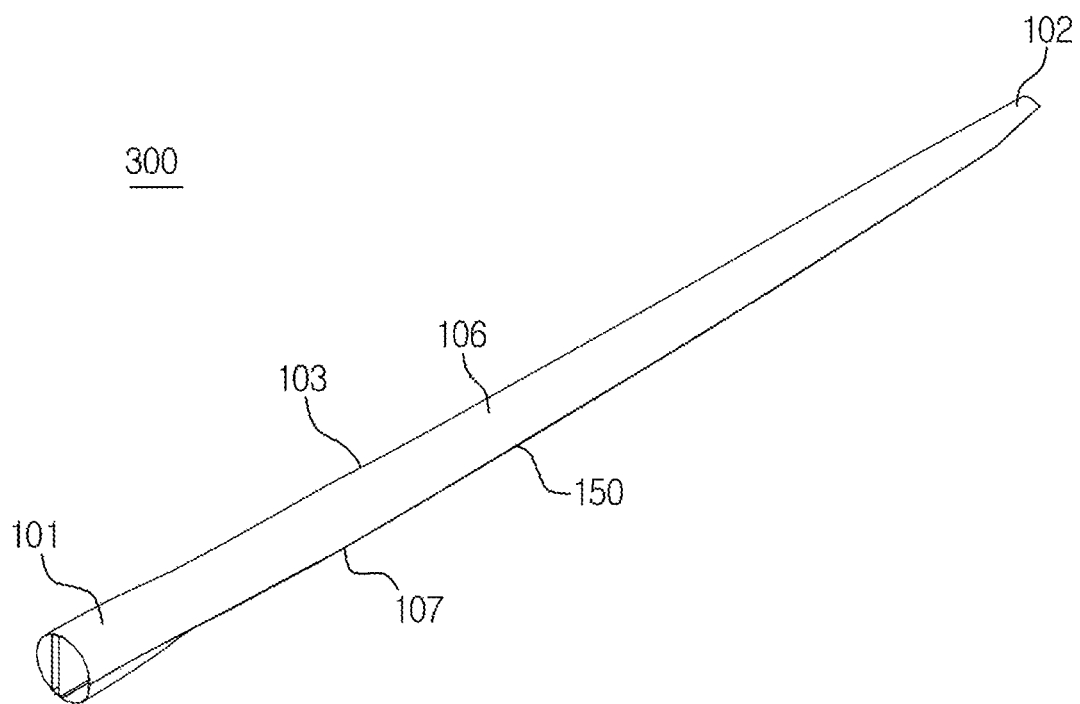
FIG. 12 is a perspective view of a blade according to the preferred third exemplary embodiment of the present invention.
Figure 13:
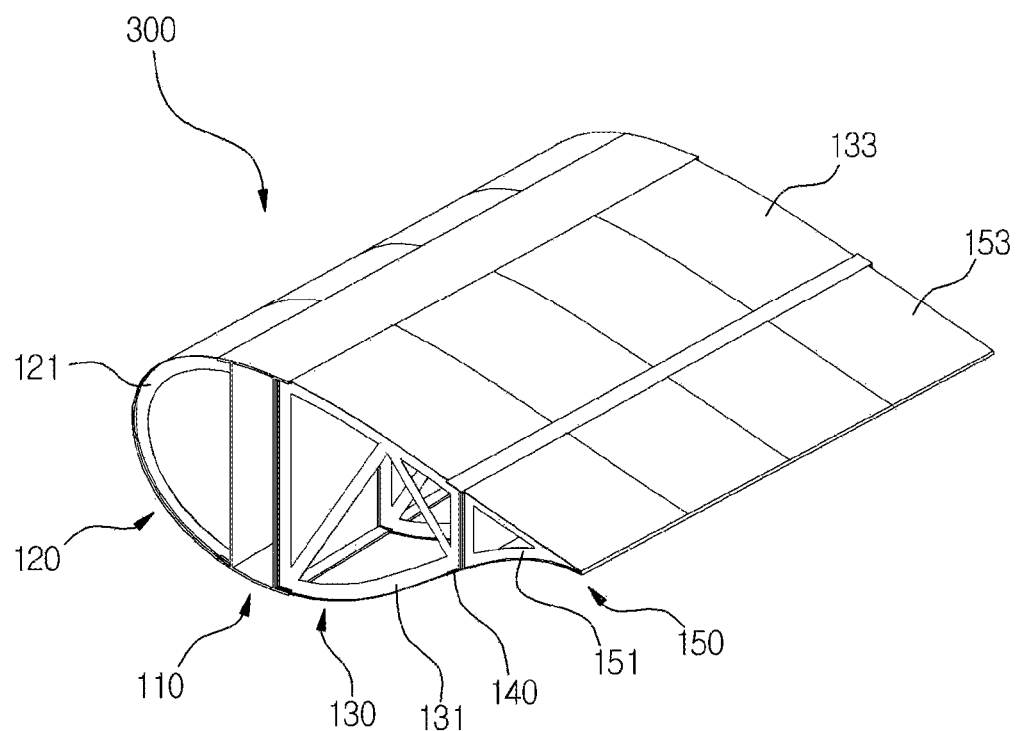
FIG. 13 is a perspective view illustrating a part of the blade in FIG. 12.
Figure 14:
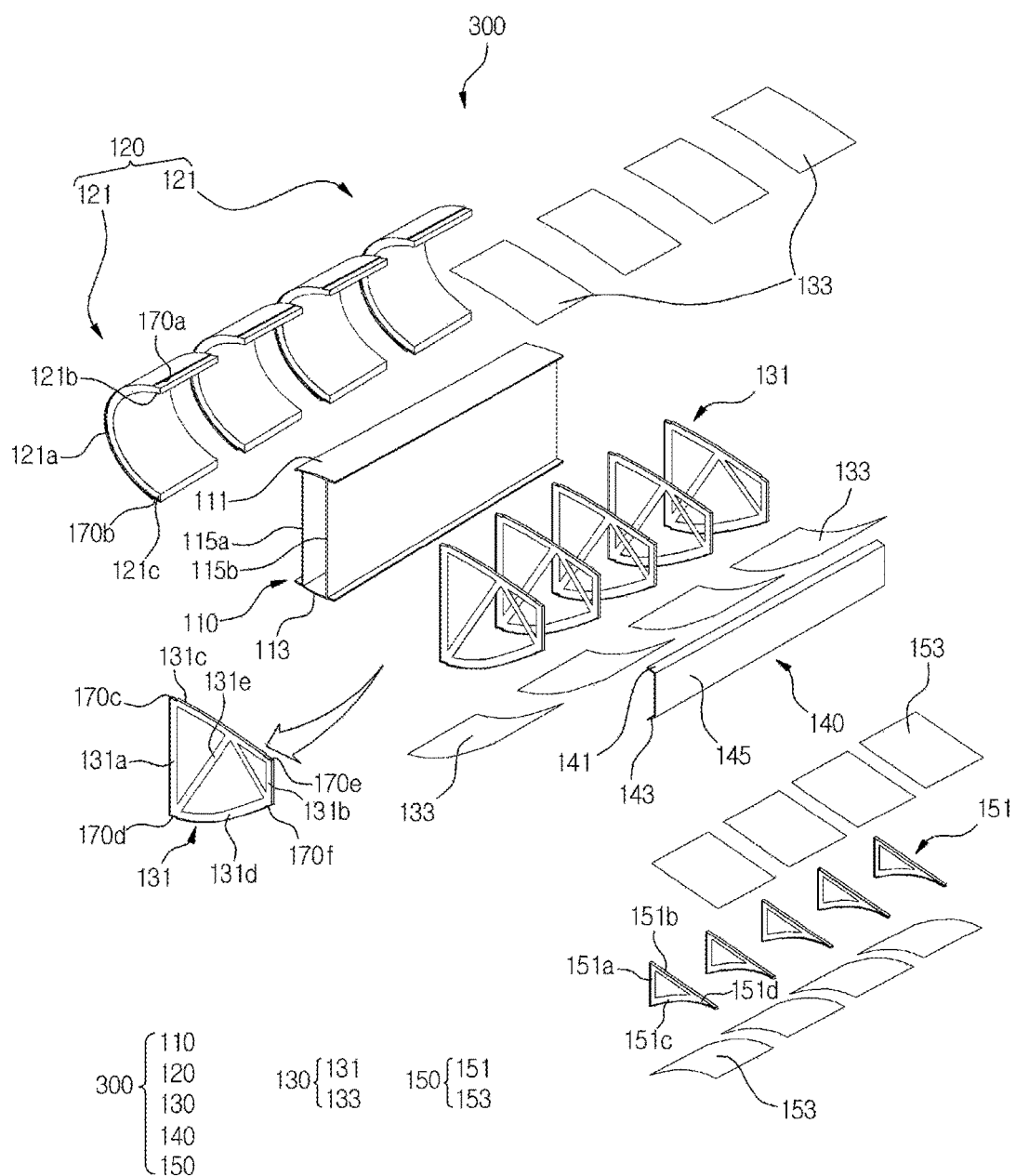
FIG. 14 is an exploded perspective view illustrating disassembled state of the blade in FIG. 13.
Figure 15:
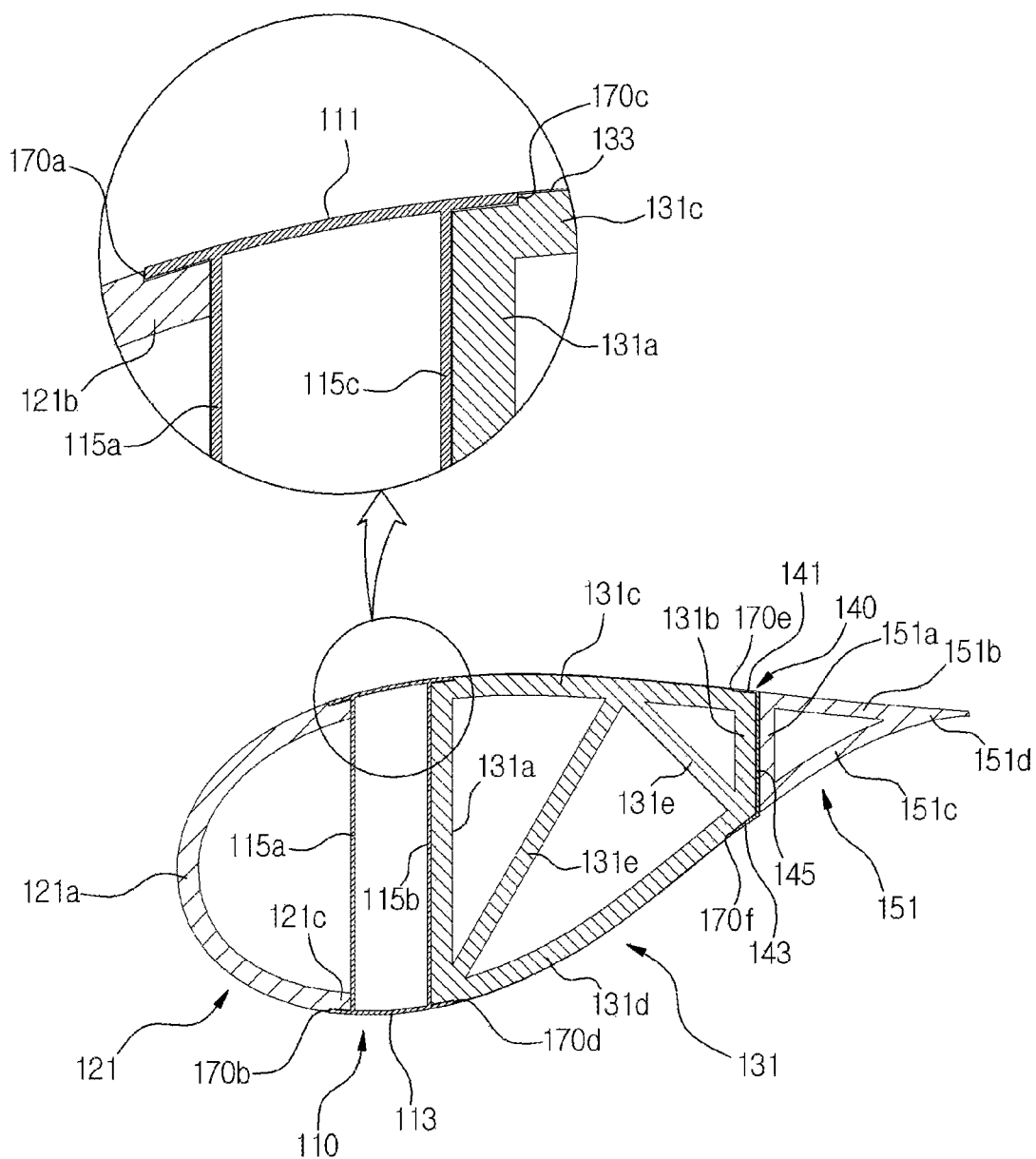
FIG. 15 is a cross-sectional view illustrating the cross-section of the blade in FIG. 13.
Figure 16:
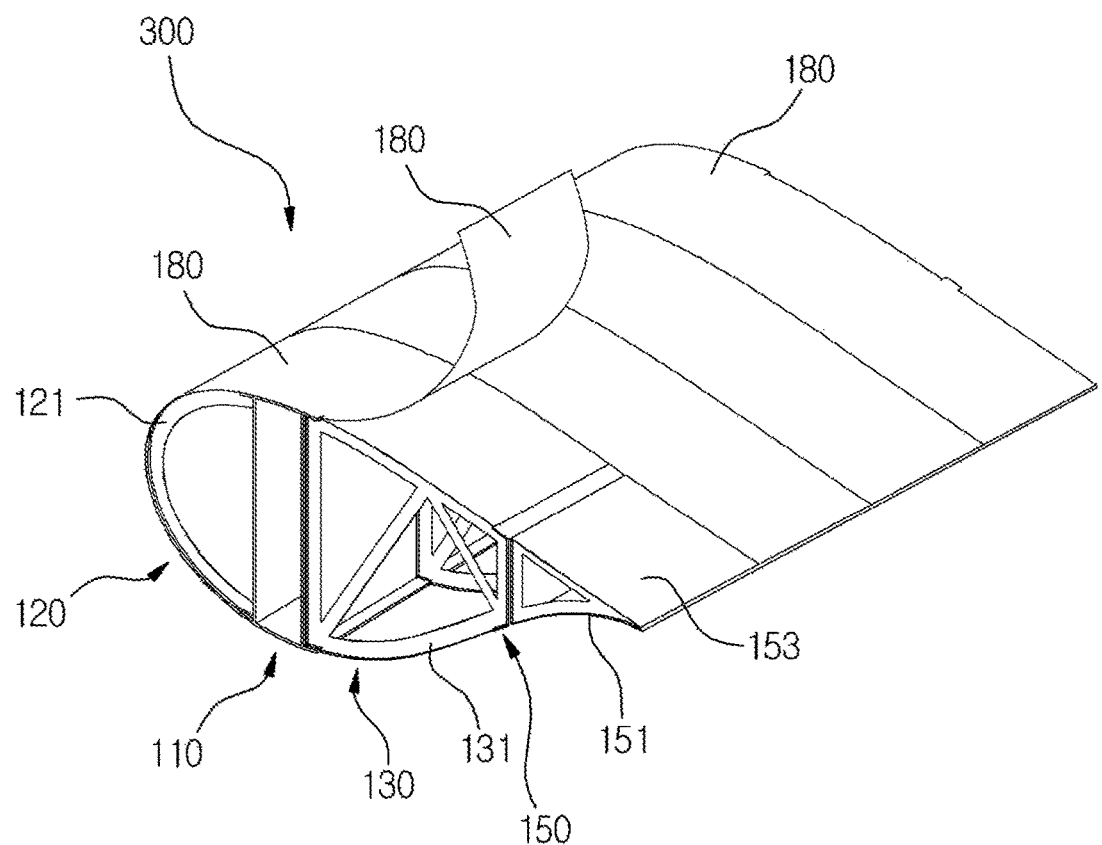
FIG. 16 is a perspective view illustrating the process of combining a plurality of skins into the blade in FIG. 13.
Figure 17:
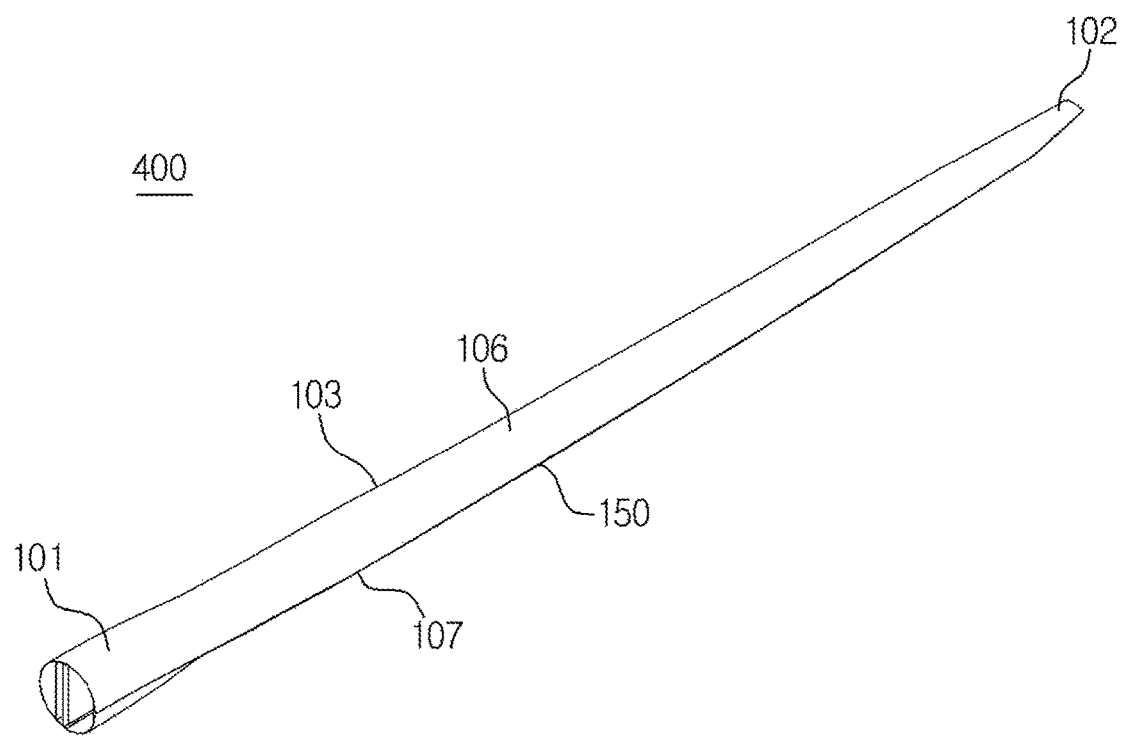
FIG. 17 is a perspective view of a blade according to the preferred fourth exemplary embodiment of the present invention.
Figure 18:
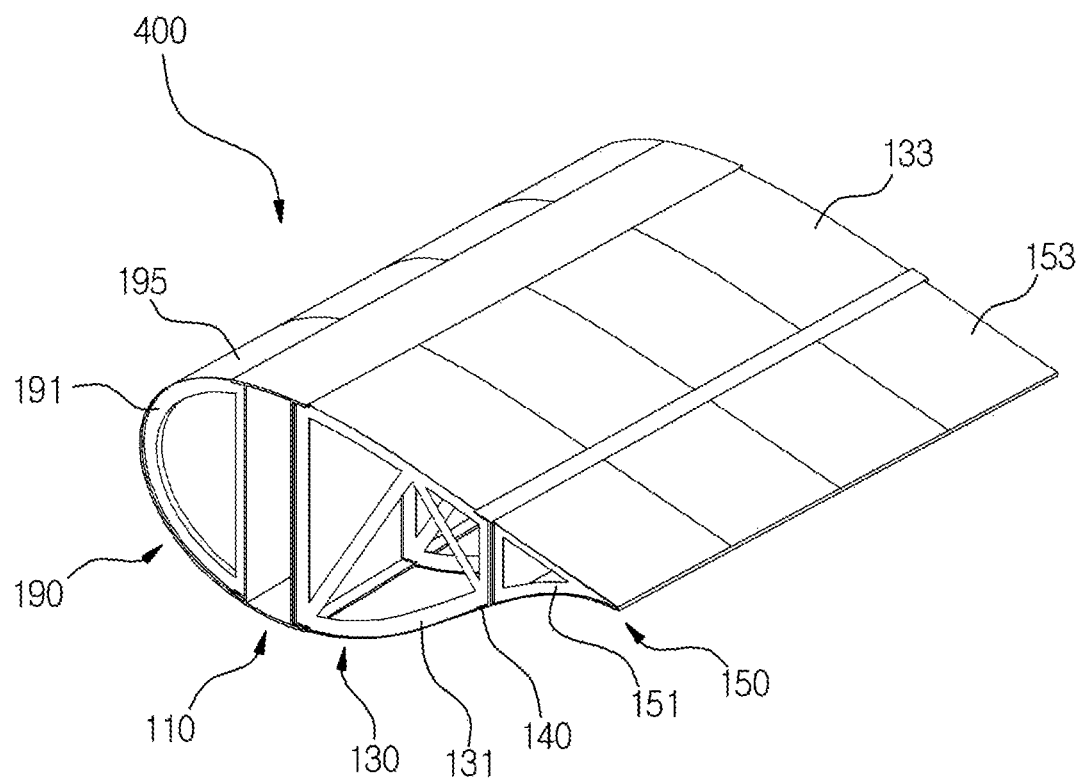
FIG. 18 is a perspective view illustrating a part of the blade in FIG. 17.
Figure 19:
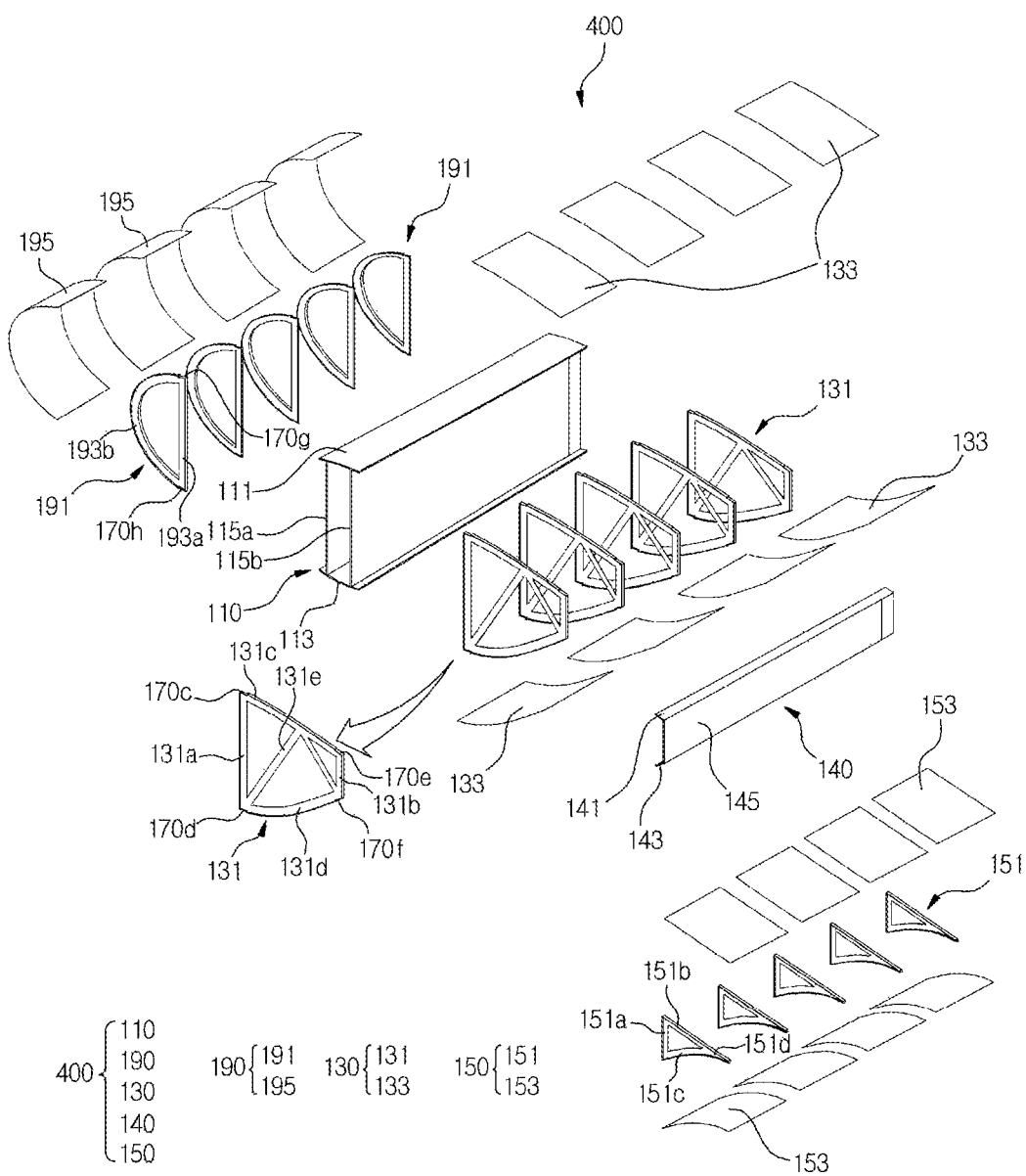
FIG. 19 is an exploded perspective view illustrating disassembled state of the blade in FIG. 18.
Figure 20:
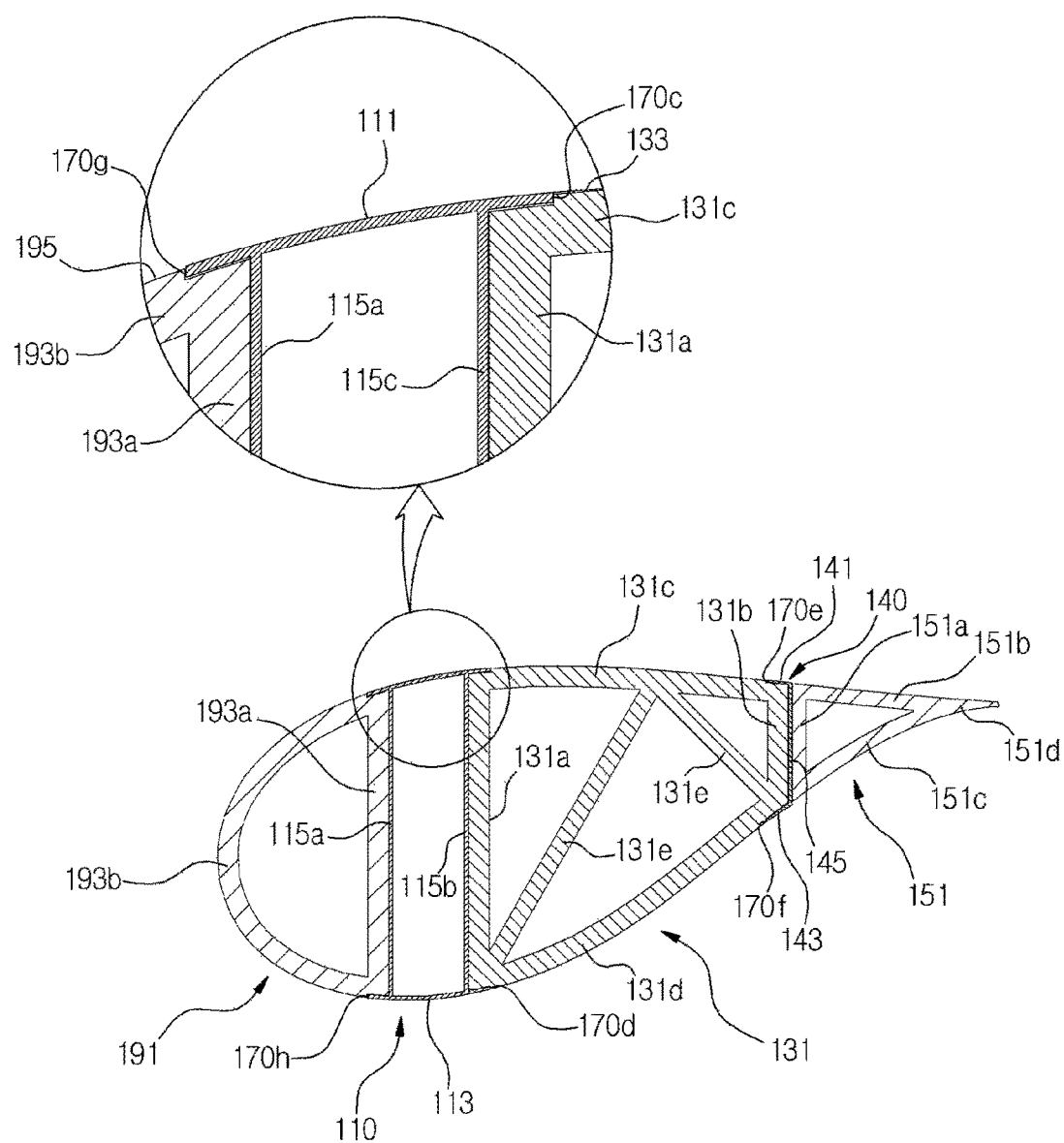
FIG. 20 is a cross-sectional view illustrating the cross-section of the blade in FIG. 18.
Figure 21:
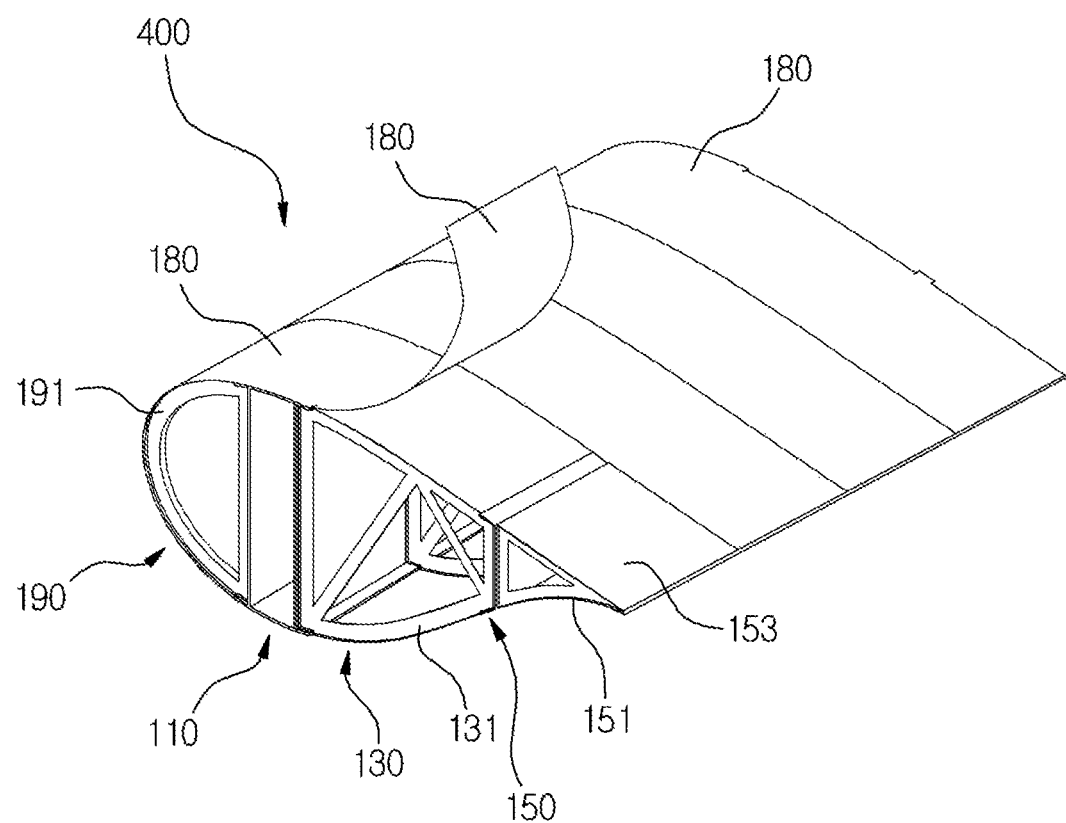
FIG. 21 is a perspective view illustrating the process of combining a plurality of skins into the blade in FIG. 18.

FIG. 1 is a side view of a wind power generator provided with a blade according to a preferred first exemplary embodiment of the present invention; FIG. 2 is a perspective view of a blade according to the preferred first exemplary embodiment of the present invention; FIG. 3 is a perspective view illustrating a part of the blade in FIG. 2; FIG. 4 is an exploded perspective view illustrating disassembled state of the blade in FIG. 3; FIG. 5 is a cross-sectional view illustrating the cross-section of the blade in FIG. 3; FIG. 6 is a perspective view illustrating the process of combining a plurality of skins into the blade; FIG. 7 is a perspective view of a blade according to the preferred second exemplary embodiment of the present invention; FIG. 8 is a perspective view illustrating a part of the blade in FIG. 7; FIG. 9 is an exploded perspective view illustrating disassembled state of the blade in FIG. 8; FIG. 10 is a cross-sectional view illustrating the cross-section of the blade in FIG. 8; FIG. 11 is a perspective view illustrating the process of combining a plurality of skins into the blade in FIG. 8; FIG. 12 is a perspective view of a blade according to the preferred third exemplary embodiment of the present invention; FIG. 13 is a perspective view illustrating a part of the blade in FIG. 12; FIG. 14 is an exploded perspective view illustrating disassembled state of the blade in FIG. 13; FIG. 15 is a cross-sectional view illustrating the cross-section of the blade in FIG. 13; FIG. 16 is a perspective view illustrating the process of combining a plurality of skins into the blade in FIG. 13; FIG. 17 is a perspective view of a blade according to the preferred fourth exemplary embodiment of the present invention; FIG. 18 is a perspective view illustrating a part of the blade in FIG. 17; FIG. 19 is an exploded perspective view illustrating disassembled state of the blade in FIG. 18; FIG. 20 is a cross-sectional view illustrating the cross-section of the blade in FIG. 18; and FIG. 21 is a perspective view illustrating the process of combining a plurality of skins into the blade in FIG. 18.

As illustrated in FIG. 1, a wind power generator 10 equipped with blades 100 according to the preferred first exemplary embodiment of the present invention comprises: a tower 11, a nacelle 13, a hub 15 and a plurality of blades 100.

The tower 11 is fixedly installed in the ground surface, and performs supporting function for the nacelle 13, the hub 15 and the blades 100. In this case, it is preferred that the tower 11 is installed in a place where the atmospheric interference can be minimized such as a ridge of a mountain, above the sea, or a roof of a building.

The hub 15 is installed in the front end portion of the nacelle 13, and can be coupled to the nacelle 13 so that it can be rotated centered around the axis.

The above described blade 100 for a wind power generator 10 can be applied not only to the blade 100 according to the preferred first exemplary embodiment of the present invention, which will be described later, but also to the blades 200, 300 and 400 according to the preferred second to fourth exemplary embodiments of the present invention.

Hereinafter, a blade 100 according to the preferred first exemplary embodiment of the present invention will be described.

As illustrated in FIGS. 2 and 5, the blade 100 has an airfoil cross-section, and it may be installed in the hub 15 in multiple numbers in a way that they have a certain angle of attack with respect to the wind blowing from the front of the wind power generator 10.

A blade root 101 is provided at the one end of the blade 100, and a blade tip 102 is provided at the other end thereof. In this case, the direction from the blade root 101 towards the blade tip 102 is known as spanwise direction.

The blade root 101 is the region wherein the blade 100 and the hub 15 are jointed, and the blade tip 102 is the region wherein the cross-sectional area of the blade 100 is getting smaller as it travels along the spanwise direction towards the other end of the blade 100.

In addition, a leading edge 103 is formed in the front side of the blade 100, and a flat back 104 is formed in the rear side of the blade 100. In this case, the direction from the leading edge 103 towards the flat back 104 is referred to as a chordwise direction.

The upper surface of the blade 100 is comprised of a suction surface 106, and the lower surface of the blade 100 is comprised of a pressure surface 107.

The suction surface 106 is an approximately convex surface, and it is a surface wherein the pressure is reduced because the wind blowing towards the leading edge 103 of the blade 100 is passing through this surface with a relatively higher speed.

The pressure surface 107 is an approximately concave surface, and it is a surface wherein the pressure is reduced because the wind blowing towards the leading edge 103 of the blade 100 is passing through this surface with a relatively slower speed.

The difference between the wind speeds in the suction surface 106 and the pressure surface 107, as described above, generates a lifting force directing from the pressure surface 107 towards the suction surface 106 in the blade 100, and the generated lifting force rotates the blade 100 thereby.

In other words, as the wind blowing from the front side of the wind power generator 10 passes through the surface of the blade 100, a lifting force is generated; the lifting force generated in this way rotates the blade 100 and the hub 15, and the rotational force of the blade 100 and the hub 15 is transferred to the nacelle 13 and converted into the electrical energy thereby.

As illustrated in FIGS. 3 to 5, a blade 100 according to the preferred first exemplary embodiment of the present invention may comprise: a main spar 110; a first body 120 located in the front side of the main spar 110; a second body 130 located in the rear side of the main spar 110; and a rear spar 140 located in the rear side of the second body 130.

Hereinafter, a main spar 110 of the blade 100 according to the preferred first exemplary embodiment of the present invention will be described.

The main spar 110 comprises: a pair of main spar flanges 111 and 113, both ends thereof are protruded towards the front side and the rear side, respectively; and a main spar web connecting the pair of main spar flanges 111 and 113.

Among the pair of main spar flanges 111 and 113, the main spar flange formed in the upper side of the main spar 110 is an upper main spar flange 111; among the pair of main spar flanges 111 and 113, the main spar flange formed in the lower side of the main spar 110 is a lower main spar flange 113.

Each of the upper main spar flange 111 and the lower main spar flange 113 is protrudedly formed along the front-to-rear direction, that is, chordwise direction.

In addition, the main spar web connecting the pair of the main spar flanges 111 and 113 may comprise a front main spar web 115a and a rear main spar web 115b, and in this case, the main spar 110 has a cross-section having the shape of approximately Korean character ' 工 ,' and may be manufactured with a ' 工 -type beam' formed long in length along the spanwise direction of the blade 100.

Of course, the main spar web may comprise a single main spar web, and in this case, the main spar 110 has a cross-section having the shape of approximately letter 'I,' and may be manufactured with an 'I-type beam' formed long in length along the spanwise direction of the blade 100.

The above described pair of main spar flanges 111 and 113, that is, the upper main spar flange 111 and the lower main spar flange 113 may be formed to have (different) predetermined curvatures respectively depending on the curvatures of the pressure surface 107 and the suction surface 106 of the blade 100.

In other words, the upper main spar flange 111 constituting a portion of the suction surface 106 of the blade 100 may have an upwardly convex curvature, but the lower main spar flange 113 constituting a portion of the pressure surface 107 of the blade 100 may have a downwardly concave curvature.

Thus, the cross-section of the above described main spar 110 has either a cross-section having the shape of approximately Korean character ' 工 ' or a cross-section having the shape of approximately letter 'I.'

Hereinafter, the first body 120 of the blade 100 according to the preferred first exemplary embodiment of the present invention will be described.

As illustrated in FIGS. 3 to 5, the first body 120 is located in front of the main spar 110, and the front side of the first body 120 constitutes the leading edge 103 of the blade 100.

In the rear side of the first body 120, a pair of steps 170a and 170b is formed so as to be coupled to a pair of main spar flanges 111 and 113 of the main spar 110, that is, the protruded front sides of the upper main spar flange 111 and the lower main spar flange 113.

The first body 120 may comprise a plurality of C-type spars 121 disposed in front side of the main spar 110 along the spanwise direction of the main spar 110.

Each of the plurality of C-type spars 121 has a cross-section having the shape of an approximately letter 'C,' and may be manufactured with a 'C-type beam' formed long in the spanwise direction of the blade 100.

In addition, each of the plurality of C-type spars 121 comprises, a block portion 121a, an upper end portion 121b and a lower end portion 121c formed extendedly from the upper and the lower sides of the block portion 121a.

The block portion 121a is the portion formed convexly towards the front side of the C-type spar 121, and due to such convex shape of the block portion 121a the leading edge of the blade 100 is formed.

A pair of steps 170a and 170b is formed at the upper end portion 121b and the lower end portion 121c respectively.

The step 170a of the upper end portion 121b is formed in the rear side surface of the upper end portion 121b, and formed in the shape of Korean character ' ㄴ ' to form a step thereby. An adhesive may be deposited on the step 170a of the upper end portion 121b and on the upper surface and the lower surface of the protruded front sides of the upper main spar flange 111, and due to this, the step 170a of the upper end portion 121b and the upper main spar flange 111 are coupled (bonded) to each other with an adhesive.

The step 170b of the lower end portion 121c is formed in the rear side surface of the upper end portion 121c, and formed in the shape of Korean character 'inverted ㄱ' to form a step thereby. An adhesive may be deposited on the step 170c of the lower end portion 121c and on the front surface and the upper surface of the protruded front sides of the lower main spar flange 113, and due to this, the step 170b of the lower end portion 121c and the lower main spar flange 113 are coupled (bonded) to each other by the adhesive.

As described above, the upper main spar flange 111 and the lower main spar flange 113, that is, a pair of main spar flanges 111 and 113 is coupled (bonded) to the pair of steps 170a and 170b formed in the C-type spar 121 with an adhesive, so that the C-type spar 121 and the main spar 110 are easily coupled together.

Hereinafter, the second body 130 of the blade 100 according to the preferred first exemplary embodiment of the present invention will be described.

As illustrated in FIGS. 3 to 5, the second body 130 is located in rear of the main spar 110, and the rear spar 140 is located in the rear side of the second body 130.

In the front side of the second body 130, a pair of steps 170c and 170d is formed so as to be respectively coupled to the protruded rear sides of the pair of main spar flanges 111 and 113, that is, the upper main spar flange 111 and the lower main spar flange 113 of the main spar 110.

In the rear side of the second body 130, a pair of steps 170e and 170f is formed so as to be respectively coupled to the protruded front sides of a pair of rear spar flanges 141 and 143, that is, an upper rear spar flange 141 and a lower rear spar flange 143 of a rear spar 140 which will be described later.

The second body 130 may comprise: a plurality of curved ribs 131 disposed between the main spar 110 and the rear spar 140 along the spanwise direction so as to couple the rear side of the main spar 110 and the front side of the rear spar 140; and a plurality of curved rib skins 133 disposed between the adjacent curved ribs 131 among the plurality of the curved ribs 131.

Each of the plurality of curved ribs 131 comprises: a first vertical frame 131a whose front surface is coupled to the rear side surface of the main spar web with an adhesive; a second vertical frame 131b whose rear surface is coupled to the front side surface of a rear spar web 145 with an adhesive; a first curved frame 131c connecting the upper side of the first vertical frame 131a and the upper side of the second vertical frame 131b; a second curved frame 131d connecting the lower side of the first vertical frame 131a and the lower side of the second vertical frame 131b; and a reinforcing frame 131e connecting the first curved frame 131c and the second curved frame 131d.

The front side surface of the first vertical frame 131a is coupled (bonded) to the rear side surface of the main spar web of the main spar 110 with an adhesive.

When the main spar 110 is manufactured with a ' 工 -type beam,' as illustrated in FIGS. 3 to 5, the front side surface of the first vertical frame 131*a* is bonded to the rear side surface of the rear spar web 115*b* of the main spar 110 with an adhesive.

Of course, as described above, when the main spar 110 is manufactured with an 'I-type beam,' the front side surface of the first vertical frame 131*a* is bonded to the rear side surface of the main spar web of the main spar 110 (that is, the rear side surface of a single main spar web) with an adhesive.

A pair of steps 170*c* and 170*d* is respectively formed in the upper side and the lower side of the first vertical frame 131*a*. And the protruded rear sides of the pair of main spar flanges 111 and 113, that is, the upper main spar flange 111 and the lower main spar flange 113 of the main spar 110 are respectively coupled (bonded) to the pair of steps 170*c* and 170*d* formed in the upper side and the lower side of the first vertical frame 131*a*.

The step 170*c* formed in the upper side of the first vertical frame 131*a* is formed in the front side surface of the upper portion of the first vertical frame 131*a*, and formed in the shape of Korean character ' ㄴ ' to form a step thereby.

An adhesive may be deposited on the surface of the step 170*c* formed in the upper side of the first vertical frame 131*a*, and on the rear side surface and the lower side surface of the protruded rear side of the main spar flange 111, and due to this, the step 170*c* formed in the upper side of the first frame 131*a* and the upper main spar flange 111 are coupled (bonded) to each other.

The step 170*d* formed in the lower side of the first vertical frame 131*a* is formed in the front side surface of the lower side of the first vertical frame 131*a*, and formed in the shape of Korean character 'inverted ㄱ' to form a step thereby.

An adhesive may be deposited on the surface of the step 170*d* formed in the lower side of the first vertical frame 131*a*, and on the rear side surface and the upper side surface of the protruded rear side of the lower main spar flange 113, and due to this, the step 170*d* formed in the lower side of the first frame 131*a* and the lower main spar flange 113 are coupled (bonded) to each other.

As described above, the upper main spar flange 111 and the lower main spar flange 113, that is, a pair of main spar flanges 111 and 113 is coupled (bonded) to the pair of steps 170*c* and 170*d* respectively formed in the upper side and the lower side of the first vertical frame 131*a* with an adhesive, so that the curved rib 131 and the main spar 110 are easily coupled together.

In addition, due to the front side surface of the first vertical frame 131*a* and the pair of steps 170*c* and 170*d* respectively formed in the upper side and the lower side of the first vertical frame 131*a*, the coupling (bonding) area between the first vertical frame 131*a* and the rear main spar web 115*b* (contacting area between the first vertical frame 131*a* and the rear main spar web 115*b*) becomes larger, therefore there is an effect that the coupling between the curved rib 131 and the main spar 110 becomes more stable.

The rear side surface of the second vertical frame 131*b* is coupled (bonded) to the front side surface of the rear web 145 of the rear spar 140 with an adhesive.

A pair of steps 170*e* and 170*f* is respectively formed in the upper side and the lower side of the second vertical frame 131*b*. And the protruded front sides of the upper rear spar flange 141 and the lower rear spar flange 143 are respectively coupled (bonded) to the pair of steps 170*e* and 170*f* respectively formed in the upper side and the lower side of the second vertical frame 131*b*.

The step 170*e* formed in the upper side of the second vertical frame 131*b* is formed in the rear side surface of the upper side of the second vertical frame 131*b*, and formed in the shape of Korean character ' ㄴ ' to form a step thereby.

An adhesive may be deposited on the surface of the step 170*e* formed in the upper side of the second vertical frame 131*b*, and on the front side surface and the lower side surface of the protruded front side of the upper rear spar flange 141, and due to this, the step 170*e* formed in the upper side of the second vertical frame 131*b* and the upper rear spar flange 141 are coupled (bonded) to each other.

An adhesive may be deposited on the surface of the step 170*f* formed in the lower side of the second vertical frame 131*b*, and formed in the shape of Korean character 'inverted ㄱ' to form a step thereby.

An adhesive may be deposited on the surface of the step 170*f* formed in the lower side of the second vertical frame 131*b* and on the front side surface and the upper side surface of the protruded front side of the lower rear spar flange 143, and due to this, the step 170*f* formed in the lower side of the second vertical frame 131*b* and the lower rear spar flange 143 are coupled (bonded) to each other.

As described above, the upper main spar flange 111 and the lower main spar flange 113, that is, the upper rear spar flange 141 and the lower rear spar flange 143 are coupled (bonded) to the pair of steps 170*e* and 170*f* respectively formed in the upper side and the lower side of the second vertical frame 131*b* with an adhesive, so that curved rib 131 and the rear spar 140 are easily coupled together.

In addition, due to the rear side surface of the second vertical frame 131*b* and the pair of steps 170*e* and 170*f* respectively formed in the upper side and the lower side of the second vertical frame 131*b*, the coupling (bonding) area between the second vertical frame 131*b* and the rear spar web 145 (contacting area between the second vertical frame 131*b* and the rear spar web 145) becomes larger, therefore there is an effect that the coupling between the curved rib 131 and rear spar 140 becomes more stable.

The first curved frame 131*c*, whose both ends are extendedly formed from the upper side of the first vertical frame 131*a* and the upper side of the second vertical frame 131*b* respectively so as to connect the upper side of the first frame 131*a* and the upper side of the second vertical frame 131*b*, may be formed to be the shape of a curve having a curvature.

In this case, the first curved frame 131*c* may have an upwardly convex curvature. Due to this, the first curved frame 131*c* and the above described upper main spar flange 111 constitute the suction space 106 of the blade 100.

The second curved frame 131*d*, whose both ends are extendedly formed from the lower side of the first vertical frame 131*a* and the lower side of the second vertical frame 131*b* respectively so as to connect the lower side of the first frame 131*a* and the lower side of the second vertical frame 131*b*, may be formed to be the shape of a curve having a curvature.

In this case, the second curved frame 131*d* may have a downwardly concave curvature. Due to this, the second curved frame 131*d* and the above described lower main spar flange 113 constitute the pressure space 107 of the blade 100.

The reinforcing frame 131*e* whose both ends are extendedly formed from the first curved frame 131*c* and the second curved frame 131*d* respectively so as to connect the first curved frame 131*c* and the second curved frame 131*d*.

In this case, the reinforcing frame 131*e*, which is a kind of truss, connects and supports the first curved frame 131*c* and the second curved frame 131*d*, and plays the role of preventing the curved rib 131 from being damaged or deformed thereby.

A plurality of curved rib skins 133 is respectively disposed between the adjacent ribs among the plurality of curved ribs 131, and constitutes the upper surface and the lower surfaces of the curved ribs 131.

For the case of a curved rib skin 133, among the curved rib skins 133, disposed at the upper side of the curved ribs 131, by disposing an adhesive on the lower side surface of the curved rib skin 133 corresponding to the upper surface of the first curved frame 131*c*, the curved rib skin 133 can be coupled (bonded) to the upper side of the curved rib 131.

For the case of a curved rib skin 133, among the curved rib skins 133, disposed at the lower side of the curved ribs 131, by disposing an adhesive on the upper side surface of the curved rib skin 133 corresponding to the lower surface of the second curved frame 131*d*, the curved rib skin 133 can be coupled (bonded) to the lower side of the curved rib 131.

Therefore, a plurality of curved rib skins 133, among the plurality of curved rib skins 133, disposed at the upper side of the curved ribs 131, constitutes the suction space 106 of the blade 100; a plurality of curved rib skins 133, among the plurality of curved rib skins 133, disposed at the lower side of the curved ribs 131, constitutes the pressure space 107 of the blade 100.

Hereinafter, the rear spar 140 of the blade 100 according to the preferred first exemplary embodiment will be described.

The rear spar 140 is located at the rear side of the second body 130 and comprises: a pair of rear spar flanges 141 and 143 whose both ends is protruded towards the front side respectively; and a rear spar web 145 connecting the pair of rear flanges 141 and 143.

The rear spar 140 has a cross-section having the shape of an approximately Korean letter 'inverted ㄷ,' and may be manufactured with a 'inverted ㄷ type beam' formed long in the spanwise direction of the blade 100.

Among the pair of rear spar flanges 141 and 143, the rear spar flange formed in the upper side of the rear spar 140 is an upper rear spar flange 141; among the pair of rear spar flanges 141 and 143, the rear spar flange formed in the lower side of the rear spar 140 is a lower rear spar flange 143.

Each of the upper rear spar flange 141 and the lower rear spar flange 143 is protrudedly formed towards the front.

In addition, the pair of rear spar flanges 141 and 143, that is, the upper rear spar flange 141 and the lower rear spar flange 143 may be formed to have (different) predetermined curvatures respectively depending on the curvatures of the pressure surface 107 and the suction surface 106 of the blade 100.

In other words, the upper rear spar flange 141 constituting a portion of the suction surface 106 of the blade 100 may have an upwardly convex curvature, and the lower rear spar flange 113 constituting a portion of the pressure surface 107 of the blade 100 may have a downwardly concave curvature.

Thus, the cross-section of the above described rear spar 140 shall have a cross-section having the shape of approximately Korean character 'inverted ㄷ.'

The blade 100 according to the preferred first exemplary embodiment of the present invention is achieved, as described above, through chordwise coupling (bonding) of the first body 120, the main spar 110, the second body 130 and the rear spar 140.

Therefore, the cross-section, that is, the airfoil of the blade 100 comprises the first body 120, the main spar 110, the second body 130 and the rear spar 140.

In addition, as described above, the blade 100 according to the preferred first exemplary embodiment of the present invention is provided with a leading edge 103 and a flat back 104, wherein the leading edge 103 comprises a plurality of C-type spars 121 constituting the first body 120, and the flat back 104 comprises the rear side surface of the rear spar web 145 of the rear spar 140.

In addition, as described above, the blade 100 according to the preferred first exemplary embodiment of the present invention is provided with a suction surface 106 and a pressure surface 107, wherein the suction surface 106 comprises: a plurality of upper surfaces of the plurality of C-type spars 121 constituting the first body 120; an upper surface of the upper main spar flange 111 of the main spar 110; an upper surface of the curved rib skin 133 located in the upper side among the curved rib skins 133 of the second body 130; and an upper surface of the lower rear spar flange 143 of the rear spar 140.

The pressure surface 107 comprises: a plurality of lower surfaces of the plurality of C-type spars 121 constituting the first body 120; a lower surface of the lower main spar flange 113 of the main spar 110; a lower surface of the curved rib skin 133 located in the lower side among the curved rib skins 133 of the second body 130; and a lower surface of the lower rear spar flange 143 of the rear spar 140.

The airfoil of the blade 100 according to the preferred first exemplary embodiment of the present invention may be formed in a way that the size thereof is getting smaller as it travels from the blade root 101 toward the blade tip 102.

Accordingly, the first body 120 located in the front side of the main spar 110 and the second body 130 located in the rear side of the main spar 110 may be formed in a way that the lengths thereof along the chordwise direction are getting smaller as they travel from the blade root 101 toward the blade tip 102.

To be explained more specifically, among the plurality of C-type spars 121, the C-type spar 121 located closer towards the blade tip 102 is formed to have a shorter chordwise length than that of the C-type spar 121 located closer towards the blade root 101.

In other words, the C-type spars 121 disposed at the front side of the main spar 110 in multiple numbers along the spanwise direction is formed in a way that the size (chordwise length) thereof is getting smaller as it is more closely disposed towards the blade tip 102.

In addition, the chordwise length of the curved rib 131, located closer to the blade tip 102, among the plurality of curved ribs 131 constituting the second body 130, is formed to be smaller than that of the curved rib 131 located closer to the blade root 101.

In other words, the curved rib 131 disposed at the rear side of the main spar 110 in multiple numbers along the spanwise direction is formed in a way that the size (chordwise length) thereof is getting smaller as it is more closely disposed towards the blade tip 102.

As describe above, by forming the sizes of the plurality of C-type spars 121 and the plurality of curved ribs 131 to be decreased as they travel towards the blade tip 102, the aerodynamic shape of the blade 100 can be formed easily.

In addition, it is preferred that the spanwise length of the plurality of C-type spars 121 is to be equal to the sum of the separation distance between the adjacent curved ribs 131 among the plurality of curved ribs 131, and the spanwise length of the curved rib 131 itself. In this case, the spanwise length of the curved rib skin 133 is formed to be equal to the spanwise length of the C-type spar 121, and due to this, the spanwise length of the C-type spar 121 and the spanwise length of the assembled body of two curved ribs 131 and a curved rib skin 133 are formed to be equal.

The blade 100 according to the preferred first exemplary embodiment of the present invention, as illustrated in FIG. 6, may further comprise a plurality of skins 180 covering the first body 120, the main spar 110, the second body 130 and the rear spar 140.

In this case, the skin 180 constitutes the leading edge 103, the pressure surface 107, the suction surface 106 and the flat back 104 by covering: the block portion 121a and the upper and the lower surfaces of the C-type spars 121 constituting the first body 120; the upper and the lower surfaces of the pair of main spar flanges 111 and 113 of the main spar 110; the upper and the lower surfaces of the curved rib skins 133 constituting the second body 130; the upper and the lower surfaces of the pair of rear spar flanges 141 and 143 of the rear spar 140; and the rear surface of the rear spar web 145, and the like.

In addition, it is preferred that the spanwise length of the skin 180 is formed to be equal to the spanwise length of the above described C-type spar 121, and the assembled body of the two curved ribs 131 and the curved rib skin 133, and due to this, the plurality of skins 180 can be easily coupled to the blade 100 and manufactured thereby.

As described above, the blade 100 according to the preferred first exemplary embodiment of the present invention is achieved through coupling (bonding) of the first body 120, the main spar 110, the second body 130 and the rear spar 140; therefore it is advantageous in that manufacturing and transporting thereof is easy when compared to the blade manufactured by a mold-based method.

In addition, since they are coupled (bonded) to each other with a maximized coupling area, weight reduction of the blade 100 can be achieved, and reduction of manufacturing time and cost can be achieved when compared to a method of the prior art wherein coupling is performed with rivets.

Besides, since neither a rivet and nor a rivet hole is required, the surface of the blade 100 can be formed to be more smooth when compared to a method of the prior art, and due to this, the lifting force can be generated more easily through the suction surface 106 and the pressure surface 107 of the blade 100, and an increase in the efficiency of the wind power generator 10 can be achieved.

Hereinafter, a blade 200 according to the preferred second exemplary embodiment of the present invention will be described.

The blade 200 according to the preferred second exemplary embodiment of the present invention is different only in the first body 190 but the other elements are same when compared to the blade 100 according to the preferred first exemplary embodiment of the present invention. Therefore the description about the same elements will be omitted.

As illustrated in FIGS. 7 to 11, the first body of the blade 100 from the blade 100 according to the preferred second exemplary embodiment of the present invention may comprise: a plurality of inverted D-type ribs 191 disposed in the front side of the main spar 110 along the spanwise direction of the main spar 110; and a plurality of inverted C-type covers 195 respectively disposed between the adjacent inverted D-type ribs 191 among the plurality of inverted D-type ribs 191.

Each of the plurality of inverted D-type ribs 191 includes and comprises: a vertical frame 193a whose rear side surface is coupled (bonded) to the front side surface of the main spar web with an adhesive; and a convex frame 193b extendedly formed from the upper and the lower sides of the vertical frame 193a, and forwardly and convexly formed. Therefore, each of the plurality of inverted D-type ribs 191 can be manufactured to have a cross-section in the shape of an 'inverted D' by the vertical frame 193a and the convex frame 193b.

The rear side surface of the vertical frame 193a is coupled (bonded) to the front surface of the main spar web of the main spar 110 with an adhesive.

As illustrated in FIGS. 8 to 10, when the main spar 110 is manufactured with a 'ㅍ-type beam,' the rear side surface of the vertical frame 193a is bonded to the front side surface of the front main spar web 115a of the main spar 110 with an adhesive.

Of course, as described above, when the main spar 110 is manufactured with a 'I-type beam,' the rear side surface of the vertical frame 193a is bonded to the front side surface of the front main spar web 115a of the main spar 110 (that is, the front side surface of a single spar web) with an adhesive.

A pair of steps 170g and 170h is respectively formed in the upper side and the lower side of the vertical frame 193a; and the protruded front sides of a pair of main spar flanges, that is an upper main spar flange 111 and a lower main spar flange 113, is coupled (bonded) is respectively coupled to the pair of steps 170g and 170h respectively formed in the upper side and the lower side of the vertical frame 193a.

The step 170g formed in the upper side of the vertical frame 193a is formed in the rear side surface of the upper portion of the vertical frame 193a, and formed in the shape of Korean character 'ㄴ' to form a step thereby.

An adhesive may be deposited on the surface of the step 170g formed in the upper side of the vertical frame 193a, and on the front side surface and the lower side surface of the protruded front side of the main spar flange 111, and due to this, the step 170g formed in the upper side of the vertical frame 193a and the upper main spar flange 111 are coupled (bonded) to each other.

The step 170h formed in the lower side of the vertical frame 193a is formed in the rear side surface of the lower portion of the vertical frame 193a, and formed in the shape of Korean character 'inverted ㄱ' to form a step thereby. An adhesive may be deposited on the surface of the step 170h formed in the lower side of the vertical frame 193a, and on the front side surface and the upper side surface of the protruded front side of the lower main spar flange 113, and due to this, the step 170h formed in the lower side of the vertical frame 193a and the lower main spar flange 113 are coupled (bonded) to each other.

As described above, the upper main spar flange 111 and the lower main spar flange 113, that is, a pair of main spar flanges 111 and 113 is coupled (bonded) to the pair of steps 170g and 170h respectively formed in the upper side and the lower side of the vertical frame 193a with an adhesive, so that the inverted D-type rib 191 and the main spar 110 are easily coupled together.

In addition, due to the front side surface of the first vertical frame 131a and the pair of steps 170g and 170h is respectively formed in the upper side and the lower side of the vertical frame 193a, the coupling (bonding) area between the vertical frame 193a and the front main spar web 115a (contacting area between the vertical frame 193a and the front main spar web 115a) becomes larger, therefore there is an effect that the coupling between the inverted D-type rib 191 and the main spar 110 becomes more stable.

The block frame 193b is extendedly formed from the upper side and the lower side of the vertical frame 193a respectively and convexly formed towards the front side.

Such block frame 193b plays the role of constituting the frame of the leading edge 103 of the blade 200 according to the preferred second exemplary embodiment of the present invention, and due to this, the block frame 193b and the C-type cover 195 constitute the leading edge 103 of the blade 200 according to the preferred second exemplary embodiment of the present invention.

The plurality of C-type covers 195 is manufactured to have a cross-section having the shape of letter 'C' so as to cover the block frame 193b of the inverted D-type rib 191 and a portion of the upper side and the lower side of the vertical frame 193a.

Each of the plurality of C-type covers 195 may be respectively disposed between the adjacent inverted D-type ribs 191 among the plurality of inverted D-type ribs 191.

The plurality of C-type covers 195 constitutes the leading edge 103 of the blade 200 according to the preferred second exemplary embodiment of the present invention.

In this case, it is preferred that the number of the plurality of inverted D-type ribs 191, and the separation distance between the plurality of inverted D-type ribs 191 are formed to be same as the number of the plurality of curved ribs 131, and the separation distance between the plurality of curved ribs 131.

Thus, the number of the plurality of C-type covers 195, and the spanwise length of each of the plurality of C-type covers 195 may be formed to be same as the number of the plurality of curved rib skins 133, and the spanwise length of each of the plurality of curved rib skins 133.

Thus, the tensile strength applied to the ribs of the blade 200 can be uniformly distributed, and the easiness of manufacturing of the blade 200 can be achieved by making the number of inverted D-type ribs 191 and the curved ribs 131 and the like to be equal.

The blade 200 according to the preferred second exemplary embodiment of the present invention, as illustrated in FIG. 11, may further comprises a plurality of skins 180 covering the first body 190, the main spar 110, the second body 130 and the rear spar 140.

In this case, the skin 180 covers: the outer surface of the C-type cover 195 constituting the first body 190; the upper and the lower surfaces of the pair of main spar flanges 111 and 113 of the main spar 110; the upper and the lower surfaces of the curved rib skins 133 constituting the second body 130; the upper and the lower surfaces of the pair of rear spar flanges 141 and 143 of the rear spar 140; and the rear surface of the rear spar web 145, and the like, and due to this, the leading edge 103, the pressure surface 107, the suction surface 106 and the flat back 104 of the blade 200 are accomplished.

In addition, it is preferred that the spanwise length of the skin 180 is formed to be equal to the spanwise length of the above described C-type cover 195 and the curved rib skin 133, and due to this, the plurality of skins 180 can be easily coupled to the blade 200 and manufactured thereby.

Unlike the above description, the first body 190 of the blade 200 according to the preferred second exemplary embodiment of the present invention may be configured without the C-type cover 195, and in this case, the leading edge 103, the pressure surface 107 and the suction surface 106 of the blade 200 may be accomplished by covering the plurality of inverted D-type ribs 191 with the plurality of skins 180.

Hereinafter, a blade 300 according to the preferred third exemplary embodiment of the present invention will be described.

As illustrated in FIG. 12, a leading edge 103 is formed in the front side of the blade 300 according to the preferred third exemplary embodiment of the present invention, and a trailing edge 105 is formed in the rear side of the blade 300.

In this case, the direction from the leading edge 103 towards the trailing edge 105 is referred to as a chordwise direction.

In addition, the blade 300 according to the preferred third exemplary embodiment of the present invention is provided with a suction surface 106, a pressure surface 107, a blade tip 102 and a blade root 101, and since the description about this is previously described in the blade 100 according to the preferred first exemplary embodiment of the present invention, it will be omitted.

As illustrated in FIGS. 13 to 15, the blade 300 according to the preferred third exemplary embodiment of the present invention may comprise: a main spar 110; a first body 120 located in the front side of the main spar 110; a second body 130 located in the rear side of the main spar 110; a rear spar 140 located in the rear side of the second body 130; a third body 150 located in the rear side of the rear spar 140; and a trailing edge spar (not shown) located in the rear side of the third body 150.

That is, the blade 300 according to the preferred third exemplary embodiment of the present invention is different in that only the third body 150 and the trailing edge spar are further included in the blade 100 according to the preferred first exemplary embodiment of the present invention but the rest configurational elements are the same. Therefore the description about the rest configurational elements will be omitted. Of course, in the case of the blade 300 according to the preferred third exemplary embodiment of the present invention, the first body 120 comprises a plurality of C-type spar 121 like the blade 100 according to the preferred first exemplary embodiment of the present invention.

The third body 150 is located in the rear side of the rear spar 140 so as to connect the rear side of the rear spar 140 and the front side of the trailing edge spar, and may comprise: a plurality of concave ribs 151 disposed between the rear spar 140 and the trailing edge spar along the spanwise direction; and a plurality of concave rib skins 153 respectively disposed between the adjacent concave ribs 151 among the plurality of concave ribs 151.

The concave rib 151 comprises: a coupling frame 151a coupled to the rear side surface of the rear spar web 145 of the rear spar 140; an upper frame 151b extendedly formed from the coupling frame 151a; and a lower frame 151c, extendedly formed from the coupling frame 151a, connecting the lower side of the coupling frame 151a and the rear end portion of the upper frame 151b.

The coupling frame 151a is formed to have same length as the rear spar web 145, and coupled to the rear spar web 145.

In this case, an adhesive may be deposited on the front surface of the coupling frame 151a and the rear side surface of the rear spar web 145, and due to this, the coupling frame 151a and the rear spar web 145 are coupled (bonded). Thus, the plurality of concave ribs 151 may be coupled in multiple numbers and disposed along the spanwise direction so as to be disposed in the rear side of the rear spar 140.

The upper frame 151b is extendedly formed from the upper side of the coupling frame 151a and, together with the first curved frame 131c of the curved rib 131, constitutes a portion of the suction surface 106 of the blade 300. Thus, the upper frame 151b, like the first curved frame 131c, may be formed to have a curvature.

The lower frame 151c is extendedly formed from the lower side of the coupling frame 151a and connects the lower side of the coupling frame 151a and the rear end portion of the upper frame 151b.

In this case, the point where the lower frame 151c and the upper frame 151b meet is referred to as a trailing edge coupling portion 151d.

The lower frame 151c, together with the first curved frame 131c of the curved rib 131, constitutes a portion of the pressure surface 107 of the blade 300. Thus, the lower frame 151c, like the second curved frame 131d, may be formed to have a curvature. In this case, the rear end portion of the lower frame 151c should meet the rear end portion of the upper frame 151b in a way that the trailing edge coupling portion 151d is formed thereby, so it is preferred that the lower frame 151c is formed to be downwardly concave and upwardly inclined.

The plurality of concave rib skins 153 is respectively disposed between the adjacent concave ribs 151 among the plurality of concave ribs 151, thereby constituting the upper surface and the lower surface of the concave rib 151.

In the case of the concave rib skins 153, among the plurality of concave rib skins 153, that is disposed in the upper side of the concave ribs 151, an adhesive is deposited on the lower surface of the concave rib skin 153 corresponding to the upper surface of the upper frame 151b, so that the concave rib skin 153 can be coupled (bonded) to the upper side of the concave rib 151.

In the case of the concave rib skins 153, among the plurality of concave rib skins 153, that is disposed in the lower side of the concave ribs 151, an adhesive is deposited on the upper surface of the concave rib skin 153 corresponding to the lower surface of the lower frame 151c, so that the concave rib skin 153 can be coupled (bonded) to the lower side of the concave rib 151.

Thus, the concave rib skins 153, among the plurality of concave rib skins 153, that is disposed in the upper side of the concave ribs 151 constitute the suction surface 106 of the blade 300, and the plurality of curved rib skins 133, among the plurality of concave rib skins 153, that is disposed in the lower side of the concave ribs 151, constitute the pressure surface 107 of the blade 300.

In this case, it is preferred that the number of the plurality of concave ribs 151, and the separation distance between the plurality of concave ribs 151 are formed to be same as the number of the plurality of curved ribs 131, and the separation distance between the plurality of curved ribs 131.

Thus, the number of the plurality concave rib skins 153, and the spanwise length of each of the plurality of concave rib skins 153 may be formed to be same as the number of the plurality of curved rib skins 133, and the spanwise length of each of the plurality of curved rib skins 133.

Thus, the easiness of manufacturing of the blade 300 can be achieved by making the number of concave ribs 151 and the curved ribs 131 and the like to be equal.

The trailing edge spar may be manufactured with a 'beam' formed long in length towards the spanwise direction of the blade 300, and its front side surface is coupled to trailing edge coupling portion 151d of the plurality of concave ribs 151 so as to be located in the rear side of the third body 150.

Thus, the rear side surface of the trailing edge spa constitutes the trailing edge 105 of the blade 300 according to the preferred third exemplary embodiment of the present invention.

The blade 300 according to the preferred third exemplary embodiment of the present invention, as illustrated in FIG. 16, may further comprising: a first body 120; a main spar 110; a second body 130; a rear spar 140; a third body 150; and a plurality of skins 180 covering the trailing edge.

In this case, the skin 180 covers: the outer surface of the C-type spar 121 constituting the first body 120; the upper and the lower surfaces of the pair of main spar flanges 111 and 113 of the main spar 110; the upper and the lower surfaces of the curved rib skins 133 constituting the second body 130; the upper and the lower surfaces of the pair of rear spar flanges 141 and 143 of the rear spar 140; the upper and the lower surfaces of the concave rib skins 153 constituting the third body 150; and the rear surface of the trailing edge spar, and the like, and due to this, the leading edge 103, the pressure surface 107, the suction surface 106 and the flat back 104 of the blade 200 are accomplished.

As described above, the blade 300 according to the preferred third exemplary embodiment of the present invention may form the trailing edge 105 of the blade 300 by coupling of the third body and the trailing edge spar, and due to this, the easiness of manufacturing of the blade 300 can be enhanced.

In addition, in the case of blades manufactured by the mold-based method, there has been difficulty in making concave curvature of the pressure surface of the blade, however, in the case of the blade 300 according to the preferred third exemplary embodiment of the present invention, there is an advantage that the curvature of the lower frame 151c of the concave rib 151 can be easily formed by separately manufacturing the concave rib 151 constituting the third body 150.

Also, unlike the blades manufactured by the mold-based method, the angle of the trailing edge 105 of the blade 300 can be easily formed by separately manufacturing and coupling the trailing edge spar constituting the trailing edge 105 of the blade 300, and due to this, the lifting force can be generated more easily, and an increase in the efficiency of the wind power generator 10 can be achieved.

Hereinafter, a blade 400 according to the preferred fourth exemplary embodiment of the present invention will be described.

The blade 400 according to the preferred fourth exemplary embodiment of the present invention only a first body 190 is different when compared to the blade 300 according to the preferred third exemplary embodiment of the present invention but the rest configurational elements are the same. Therefore the description about the rest configurational elements will be omitted.

As illustrated in FIGS. 17 to 20, the first body 190 of the blade 400 according to the preferred fourth exemplary embodiment of the present invention may comprise: a plurality of inverted D-type ribs 191 disposed in the front side of the main spar 110 along the spanwise direction of the main spar 110; and a plurality of C-type covers 195 respectively disposed between the adjacent inverted D-type ribs 191 among the plurality of inverted D-type ribs 191.

In this case, the description about the plurality of inverted D-type ribs 191 and the plurality of C-type covers 195 can be replaced by the description of the blade 200 according to the preferred second exemplary embodiment of the present invention, and the description about this will be omitted.

The blade 400 according to the preferred fourth exemplary embodiment of the present invention, as illustrated in FIG. 21, may further comprising: a first body 190; a main spar 110; a second body 130; a rear spar 140; a third body 150; and a plurality of skins 180 covering the trailing edge.

In this case, the skin 180 covers: the outer surface of the C-type cover 195 constituting the first body 120; the upper and the lower surfaces of the pair of main spar flanges 111 and 113 of the main spar 110; the upper and the lower surfaces of the curved rib skins 133 constituting the second body 130; the upper and the lower surfaces of the pair of rear spar flanges 141 and 143 of the rear spar 140; the upper and the lower surfaces of the concave rib skins 153 constituting the third body 150; and the rear surface of the trailing edge spar, and the like, and due to this, the leading edge 103, the pressure surface 107, the suction surface 106 and the trailing edge 105 of the blade 400 are accomplished.

In addition, it is preferred that the spanwise length of the skin 180 is formed to be equal to the spanwise length of the above described C-type cover 195 and the curved rib skin 133, and due to this, the plurality of skins 180 can be easily coupled to the blade 400 and manufactured thereby.

Unlike the above description, the first body 190 of the blade 400 according to the preferred fourth exemplary embodiment of the present invention may be configured without the C-type cover 195, and in this case, the leading edge 103, the pressure surface 107 and the suction surface 106 of the blade 400 may be accomplished by covering the plurality of inverted D-type ribs 191 with the plurality of skins 180.

The spars (C-type spars 121, main spars 110, rear spars 140 and trailing edge spars) and ribs (inverted D-type ribs 191, curved ribs 131 and concave ribs 151) and the like according to the preferred first to fourth exemplary embodiments may be made of glass fiber composite materials or fiber composite materials.

In addition, the skins (skins 180, curved rib skins 133 and concave rib skins 153) and C-type covers 195 may be made of composite materials including fabric materials.

As described above, although the present invention has been described with reference to the preferred exemplary embodiments, various changes and alterations of the present invention can be made by those skilled in the art without departing from the spirit and the scope of the present invention written in the claims described herein below.

The invention claimed is:

1. A blade for a wind power generator comprising:
a main spar including:
an upper main spar flange and a lower main spar flange whose both ends are protruded towards the front and rear side respectively;
a front main spar web and a rear main spar web which are connecting the upper main spar flange and the lower main spar flange;
a first body, located in the front side of the main spar, including an inverted D-type rib; and
a second body, located in the rear side of the main spar, including a curved rib, wherein
the inverted D-type rib comprises:
a vertical frame; and
a block frame extendedly formed from the upper side and the lower side of the vertical frame respectively and convexly formed towards the front side, wherein,
the curved rib comprises:
a first vertical frame and a second vertical frame;
a first curved frame connecting the upper side of the first vertical frame and the second vertical frame; and
a second curved frame connecting the lower side of the first vertical frame and the second vertical frame, wherein
the rear side surface of the vertical frame is coupled (bonded) to the front side surface of the front main spar web with an adhesive, and
a step formed in the rear side surface of the upper side of the vertical frame is coupled (bonded) to the protruded front side surface and the lower side surface of the upper main spar flange with an adhesive, and
a step formed in the rear side surface of the lower side of the vertical frame is coupled (bonded) to the protruded front side surface and the upper side surface of the lower main spar flange with an adhesive, and
the front side surface of the first vertical frame is coupled (bonded) to the rear side surface of the rear main spar web with an adhesive, and
a step formed in the front side surface of the upper side of the first vertical frame is coupled (bonded) to the protruded rear side surface and the lower side surface of the upper main spar flange with an adhesive, and
a step formed in the front side surface of the lower side of the first vertical frame is coupled (bonded) to the protruded rear side surface and the upper side surface of the lower main spar flange with an adhesive.

2. The blade for a wind power generator according to claim 1, further comprising:
a rear spar located in the rear side of the second body, wherein
the rear spar comprises:
an upper rear spar flange and a lower rear spar flange whose one ends are protruded towards the front respectively; and
a rear spar web connecting the upper rear spar flange and the lower rear spar flange, wherein
the front surface of the rear spar web is coupled (bonded) to the rear side surface of the second vertical frame with an adhesive, and
a step formed in the rear side surface of the upper side of the second vertical frame is coupled (bonded) to the protruded front side surface and lower side surface of the upper rear spar flange with an adhesive, and
a step formed in the rear side surface of the lower side of the second vertical frame is coupled (bonded) to the protruded front side surface and upper side surface of the lower rear spar flange.

3. The blade for a wind power generator according to claim 2, comprising:
a third body located in the rear side of the rear spar; and
a trailing edge spar located in the rear side of the third body.

4. The blade for a wind power generator according to claim 3, further comprising
a skin covering the first body, the second body, the main spar, the rear spar, the third body and the trailing edge spar.

5. The blade for a wind power generator according to claim 1, wherein the inverted D-type rib is disposed in multiple numbers in the front side of the main spar along the spanwise direction.

6. The blade for a wind power generator according to claim 5, wherein the first body further includes a plurality of C-type covers respectively disposed between the adjacent inverted D-type ribs among the plurality of inverted D-type ribs.

7. The blade for a wind power generator according to claim 6, further comprising:
a rear spar located in the rear side of the second body;
a third body located in the rear side of the rear spar;
a trailing edge spar located in the rear side of the third body; and
a skin covering the plurality of C-type covers, the second body, the main spar, the rear spar, and the third body and the trailing edge spar.

* * * * *